US005546508A

United States Patent [19]
Jain et al.

[11] Patent Number: 5,546,508
[45] Date of Patent: Aug. 13, 1996

[54] CONTROLLING FLEXIBLE ROBOT ARMS USING HIGH SPEED DYNAMICS PROCESS

[75] Inventors: Abhinandan Jain, Altadena; Guillermo Rodriguez, La Canada, both of Calif.

[73] Assignee: The United States of America as represented by the Administrator of the National Aeronautics and Space Administration, Washington, D.C.

[21] Appl. No.: 862,861

[22] Filed: Apr. 3, 1992

[51] Int. Cl.$^6$ .................................................. G05B 19/40
[52] U.S. Cl. .................................................. 395/95
[58] Field of Search ................................ 395/95, 96, 97, 395/98

[56] References Cited

U.S. PATENT DOCUMENTS

| | | | |
|---|---|---|---|
| 4,132,318 | 1/1979 | Wang et al. | 395/95 |
| 4,156,835 | 5/1979 | Whitney et al. | 318/561 |
| 4,362,978 | 12/1982 | Pollard et al. | 395/95 |
| 4,547,858 | 10/1985 | Horak | 364/513 |
| 4,594,671 | 6/1986 | Sugimoto et al. | 395/98 |
| 4,680,519 | 7/1987 | Chand et al. | 395/97 |
| 4,705,999 | 11/1987 | Soji et al. | 395/96 |
| 4,706,204 | 11/1987 | Hittori | 395/97 |
| 4,725,942 | 2/1988 | Osuka | 395/97 |
| 4,725,965 | 2/1988 | Keenan | 364/513 |
| 4,756,662 | 7/1988 | Tanie et al. | 414/729 |
| 4,794,547 | 12/1988 | Nishida | 395/97 |
| 4,808,063 | 2/1989 | Haley | 395/97 |
| 4,835,710 | 5/1989 | Schnelle et al. | 395/97 |
| 4,925,312 | 5/1990 | Onaga et al. | 395/95 |
| 4,937,759 | 6/1990 | Vold | 364/513 |
| 4,972,347 | 11/1990 | Tarvin et al. | 395/98 |
| 5,020,001 | 5/1991 | Yamamoto et al. | 395/97 |
| 5,053,687 | 10/1991 | Merlet | 318/568.11 |
| 5,130,632 | 7/1992 | Ezawa et al. | 395/95 |

OTHER PUBLICATIONS

Rodriquez, G., Kreutz, K., and Jain, A., "A Spatial Operator Algebra for Manipulator Modeling and Control," The International Journal of Robotics Research, vol. 10, No. 4, Aug. 1991, pp. 371–381.

Jain, A., "Unified Formulation of Dynamics for Serial Rigid Multibody Systems," Journal of Guidance, Control and Dynamics, vol. 14, No. 3, May–Jun. 1991, pp. 531–542.

Kim, S. S. and Haug, E. J., "A Recursive Formulation for Flexible Multibody Dynamics, Part I: Open–Loop Systems," Computer Methods in Applied Mechanics and Engineering, vol. 71, No. 3, 1988, pp. 293–314.

Changizi, K. and Shabana, A. A., "A Recursive Formulation for the Dynamics Analysis of Open Loop Deformable Multibody Systems," ASME Jl. of Applied Mechanics, vol. 55, No. 3, Sep. 1988, pp. 687–693.

(List continued on next page.)

Primary Examiner—Robert W. Downs
Attorney, Agent, or Firm—John H. Kusmiss

[57] ABSTRACT

A robot manipulator controller for a flexible manipulator arm having plural bodies connected at respective movable hinges and flexible in plural deformation modes corresponding to respective modal spatial influence vectors relating deformations of plural spaced nodes of respective bodies to the plural deformation modes, operates by computing articulated body quantities for each of the bodies from respective modal spatial influence vectors, obtaining specified body forces for each of the bodies, and computing modal deformation accelerations of the nodes and hinge accelerations of the hinges from the specified body forces, from the articulated body quantities and from the modal spatial influence vectors. In one embodiment of the invention, the controller further operates by comparing the accelerations thus computed to desired manipulator motion to determine a motion discrepancy, and correcting the specified body forces so as to reduce the motion discrepancy. The manipulator bodies and hinges are characterized by respective vectors of deformation and hinge configuration variables, and computing modal deformation accelerations and hinge accelerations is carried out for each one of the bodies beginning with the outermost body by computing a residual body force from a residual body force of a previous body and from the vector of deformation and hinge configuration variables, computing a resultant hinge acceleration from the body force, the residual body force and the articulated hinge inertia, and revising the residual body force modal body acceleration.

45 Claims, 7 Drawing Sheets

OTHER PUBLICATIONS

Keat, J. E., "Multibody System Order n Dynamics Formulation Based in Velocity Transform Method," Journal of Guidance, Control and Dynamics, vol. 13, No. 2, Mar.–Apr. 1990.

Bodley, C. S., Devers, A. D., Park, A. C., and Frisch, H. P., "A Digital Computer Program for the Dynamics Interaction Simulation of Controls and Structure (DISCOS)," NASA Technical Paper 1219, NASA, May 1978.

Singh, R. P., VanderVoort, R. J., and Likins, P. W., "Dynamics of Flexible Bodies in Tree Topology—Q Computer–Oriented Approach," Journal of Guidance, Control and Dynamics, vol. 8, No. 5, Sep., 1985, pp. 584–590.

Rodriquez, G., "Kalman Filtering, Smoothing and Recursive Robot Arm Forward and Inverse Dynamics," IEEE Journal of Robotics and Automation, vol. 3, No. 6, Dec. 1987, pp. 624–639.

Likins, P. W., "Modal Method for Analysis of Free Rotations of Spacecraft," AIAA Journal, vol. 5, Jul. 1967, pp. 1304–1308.

Jain, A. and Rodriquez, G., "Recursive Dynamics for Flexible Multibody Systems using Spatial Operators," JPL (internal) Publication 90–26, Jet Propulsion Laboratory, Pasadena, CA, Dec. 1990.

Rodriquez, G., Jain, A., and Kruetz, K., "Spatial Operator Algebra for Multibody System Dynamics," Journal of the Astronautical Sciences, vol. 40, No. 1, Jan.–Mar. 1992.

Walker, M. W. and Orin, D. E., "Efficient Dynamic Computer Simulation of Robotic Mechanisms," ASME Journal of Dynamic Systems, Measurement, and Control, vol. 104, No. 3, Sep. 1982, pp. 205–211.

Luh, J. Y. S., Walker, M. W., and Paul, R. P. C., "On–line Computational Scheme for Mechanical Manipulators," ASME Journal of Dynamic Systems, Measurement, and Control, vol. 102, No. 2, Jun. 1980, pp. 69–76.

Jain, A. and Rodriquez, "Kinematics and Dynamics of Under–Actuated Manipulators," IEEE International Conference on Robotics and Automation, Sacramento, CA, Apr. 1991.

Featherstone, R., "The Calculation of Robot Dynamics using Articulated–Body Inertias," The International Journal of Robotics Research, vol. 2, No. 1, Spring 1983, pp. 13–30.

Padilla, E. E. and von Flotow, A. H., "Nonlinear Strain—Displacement Relations and Flexible Multibody Dynamics," Proceedings of the 3rd Annual Conference on Aerospace Computational Control, vol. 1, Oxnard, CA, pp. 230–245, Aug. 1989.

Kane, T. R., Ryan, R. R., and Banerjee, A. K., "Dynamics of a Cantilevered Beam attached to a Moving Base," Journal of Guidance, Control and Dynamics, vol. 10, No. 2, Mar.–Apr. 1987, pp. 139–151.

Jain, Rodriguez "Recursive Dynamics for Flexible Multibody Systems Using Spatial Operators" JPL Pub 90–26 Dec. 1990.

Jain, "Unified Formulation of Dynamics for Serial Rigid Multibody Systems" Journal of Guidance, Control & Dynamics vol. 14 #3 May–Jun. 1991.

Singh et al "Dynamics of Flexible Bodies in Tree Topologies—A Computer–Oriented Approach" Journal of Guidance, Control & Dynamics vol. 8 #5 Sep. 1985.

Rodriguez, "Spatial Operator Approach to Flexible Manipulator Inverse & Forward Dynamics", IEEE Computer Soc. Press vol. 3 xxxii & 2184 1990 pp. 845–850.

CONTROLLING FLEXIBLE ROBOT ARMS USING HIGH SPEED DYNAMICS PROCESS

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to robot manipulators and more particularly to a method and apparatus for controlling robot arms having flexible links using a high speed recursive dynamics algorithm to solve for the accelerations of link deformation and hinge rotations from specified body forces applied to the links.

2. Background Art

Controlling robot manipulator arms is a well-known problem and has been described in a number of publications. The invention herein will be described with reference to the following publications by referring to each publication by number, such as Ref. [1], Ref. [2], or simply [1] or [2], for example.

References

[1] Rodriguez, G., Kreutz, K., and Jain, A., "A Spatial Operator Algebra for Manipulator Modeling and Control," *The International Journal of Robotics Research*, Vol. 10, No. 4, August 1991, pp. 371–381.

[2] Jain, A., "Unified Formulation of Dynamics for Serial Rigid Multibody Systems," *Journal of Guidance, Control and Dynamics*, Vol. 14, No. 3, May–June 1991, pp. 531–542.

[3] Kim, S. S. and Haug, E. J., "A Recursive Formulation for Flexible Multibody Dynamics, Part I: Open-Loop Systems," *Computer Methods in Applied Mechanics and Engineering, Vol.* 71, No. 3, 1988, pp. 293–314.

[4] Changizi, K. and Shabana, A. A., "A Recursive Formulation for the Dynamic Analysis of Open Loop Deformable Multibody Systems," *ASME Jl. of Applied Mechanics*, Vol. 55, No. 3, September 1988, pp. 687–693.

[5] Keat, J. E., "Multibody System Order n Dynamics Formulation Based in Velocity Transform Method," *Journal of Guidance, Control and Dynamics*, Vol. 13, No. 2, March–April 1990.

[6] Bodley, C. S., Devers, A. D., Park, A. C., and Frisch, H. P. "A Digital Computer Program for the Dynamic Interaction Simulation of Controls and Structure (DISCOS)," NASA Technical Paper 1219, NASA, May 1978.

[7] Singh, R. P., VanderVoort, R. J., and Likins, P. W., "Dynamics of Flexible Bodies in Tree Topology—A Computer-Oriented Approach," *Journal of Guidance, Control and Dynamics*, Vol. 8, No. 5, September 1985, pp. 584–590.

[8] Rodriguez, G., "Kalman Filtering, Smoothing and Recursive Robot Arm Forward and Inverse Dynamics," *IEEE Journal of Robotics and Automation*, Vol. 3, No. 6, December 1987, pp. 624–639.

[9] Likins, P. W., "Modal Method for Analysis of Free Rotations of Spacecraft," *AIAA Journal*, Vol. 5, July 1967, pp. 1304–1308.

[10] Jain, A. and Rodriguez, G., "Recursive Dynamics for Flexible Multibody Systems using Spatial Operators," JPL Publication 90-26, Jet Propulsion Laboratory, Pasadena, Calif., December 1990.

[11] Rodriguez, G., Jain, A., and Kreutz, K., "Spatial Operator Algebra for Multibody System Dynamics," *Journal of the Astronautical Sciences*, Vol. 40, No. 1, January–March 1992.

[12] Walker, M. W. and Orin, D. E., "Efficient Dynamic Computer Simulation of Robotic Mechanisms," *ASME Journal of Dynamic Systems, Measurement, and Control*, Vol. 104, No. 3, September 1982, pp. 205–211.

[13] Luh, J. Y. S., Walker, M. W., and Paul, R. P. C., "On-line Computational Scheme for Mechanical Manipulators," *ASME Journal of Dynamic Systems, Measurement, and Control*, Vol. 102, No. 2, June 1980, pp. 69–76.

[14] Jain, A. and Rodriguez, G., "Kinematics and Dynamics of Under-Actuated Manipulators," in *IEEE International Conference on Robotics and Automation*, Sacramento, Calif., April 1991.

[15] Featherstone, R., "The Calculation of Robot Dynamics using Articulated-Body Inertias," *The International Journal of Robotics Research*, Vol. 2, No. 1, Spring 1983, pp. 13–30.

[16] Padilla, C. E. and von Flotow, A. H., "Nonlinear Strain-Displacement Relations and Flexible Multibody Dynamics," in *Proceedings of the 3rd Annual Conference on Aerospace Computational Control*, Vol. 1, Oxnard, Calif., pp. 230–245, August 1989. (JPL Publication 89-45, Jet Propulsion Laboratory, Pasadena, Calif., 1989).

[17] Kane, T. R., Ryan, R. R., and Banerjee, A. K., "Dynamics of a Cantilevered Beam attached to a Moving Base," *Journal of Guidance, Control and Dynamics*, Vol. 10, No. 2, March–April 1987, pp. 139–151.

The invention uses spatial operators to develop new spatially recursive dynamics algorithms for flexible multibody systems. The operator description of the dynamics is identical to that for rigid multibody systems. Assumed-mode models are used for the deformation of each individual body. The algorithms are based on two spatial operator factorizations of the system mass matrix. The first (Newton-Euler) factorization of the mass matrix leads to recursive algorithms for the inverse dynamics, mass matrix evaluation, and composite-body forward dynamics for the system. The second (Innovations) factorization of the mass matrix, leads to an operator expression for the mass matrix inverse and to a recursive articulated-body forward dynamics algorithm. The primary focus is on serial chains, but extensions to general topologies are also described. A comparison of computational costs shows that the articulated-body forward dynamics algorithm is much more efficient than the composite-body algorithm for most flexible multibody systems.

1. Nomenclature

We use coordinate-free spatial notation ([1, 2]) in this specification. A spatial velocity of a frame is a 6-dimensional quantity whose upper 3 elements are the angular velocity and whose lower 3 elements are the linear velocity. A spatial force is a 6-dimensional quantity whose upper 3 elements are a moment vector and whose lower 3 elements are a force vector.

A variety of indices are used to identify different spatial quantities. Some examples are: $V_s(j_k)$ is the spatial velocity of the $j^{th}$ node on the $k^{th}$ body; $V_s(k)=\text{col}\{V_s(j_k)\}$ is the composite vector of spatial velocities of all the nodes on the $k^{th}$ body; $V_s=\text{col}\{V_s(k)\}$ is the vector of spatial velocities of all the nodes for all the bodies in the serial chain. The index k will be used to refer to both the $k^{th}$ body as well as the $k^{th}$ body reference frame $\mathcal{F}_k$, with the usage being apparent from the context. Some key quantities are defined below in accordance with FIGS. 1a and 1b.

General Quantities $\tilde{x}=[X]^x \in \mathfrak{R}^{3\times3}$—the skew-symmetric cross-product matrix associated with the 3-dimensional vector x $$\dot{x} = \frac{dx}{dt}$$

the time derivative of x with respect to an inertial frame $\overset{\circ}{x}$—the time derivative of x with respect to the body-fixed (rotating) frame diag$\{x(k)\}$—a block diagonal matrix whose $k^{th}$ diagonal element is $x(k)$ col$\{x(k)\}$—a column vector whose $k^{th}$ element is $x(k)$ $l(x,y) \in \mathfrak{R}^3$—the vector from point/frame x to point/frame y $$\phi(x,y) = \begin{pmatrix} I & \tilde{l}(x,y) \\ 0 & I \end{pmatrix} \in \mathfrak{R}^{6\times6}$$

the spatial transformation operator which transforms spatial velocities and forces between points/frames x and y Individual Body Nodal Data $n_s(k)$—number of nodes on the $k^{th}$ body $\mathcal{F}_k$—body reference frame with respect to which the deformation field for the $k^{th}$ body is measured. The motion of this frame characterizes the motion of the $k^{th}$ body as a rigid body.

$j_k$—$j^{th}$ node on the $k^{th}$ body $l_0(k,j_k) \in \mathfrak{R}_3$—vector from $\mathcal{F}_k$ to the location (before deformation) of the $j^{th}$ node reference frame on the $k^{th}$ body $\delta_l(j_k) \in \mathfrak{R}^3$—translational deformation of the $j^{th}$ node on the $k^{th}$ body $l(k,j_k)=l_0(k,j_k)+\delta_l(j_k) \in \mathfrak{R}^3$—vector from $\mathcal{F}_k$ to the location (after deformation) of the $j^{th}$ node reference frame on the $k^{th}$ body $\delta_\omega(j_k) \in \mathfrak{R}^3$—deformation angular velocity of the $j^{th}$ node on the $k^{th}$ body with respect to the body frame $\mathcal{F}_k$ $\delta_v(j_k) \in \mathfrak{R}^3$—deformation linear velocity of the $j^{th}$ node on the $k^{th}$ body with respect to the body frame $\mathcal{F}_k$ $u(j_k) \in \mathfrak{R}^6$—the spatial displacement of node $j_k$. The translational component of $u(j_k)$ is $\delta_l(j_k)$, while its time derivative with respect to the body frame $\mathcal{F}_k$ is $$\overset{\circ}{u}(j_k) = \begin{pmatrix} \delta_\omega(j_k) \\ \delta_v(j_k) \end{pmatrix}$$

$\mathcal{J}(j_k) \in \mathfrak{R}^{3\times3}$—inertia tensor about the nodal reference frame for the $j^{th}$ node on the $k^{th}$ body $p(j_k) \in \mathfrak{R}^3$—vector from the nodal reference frame to the node center of mass for the $j^{th}$ node on the $k^{th}$ body $m(j_k)$—mass of the $j^{th}$ node of the $k^{th}$ body $$M_s(j_k) = \begin{pmatrix} \mathcal{J}(j_k) & m(j_k)\tilde{p}(j_k) \\ -m(j_k)\tilde{p}(j_k) & m(j_k)I \end{pmatrix} \in \mathfrak{R}^{6\times6}$$

spatial inertia about the nodal reference frame for the $j^{th}$ node on the $k^{th}$ body $M_s(k)$ diag$\{M_s(j_k)\} \in \mathfrak{R}^{6n_s(k)\times 6n_s(k)}$—structural mass matrix for the $k^{th}$ body $K_s(k) \in \mathfrak{R}^{6n_s(k)\times 6n_s(k)}$—structural stiffness matrix for the $k^{th}$ body Individual Body Modal Data $n_m(k)$—number of assumed modes for the $k^{th}$ body $\mathcal{N}(k)=n_m(k)+6$—number of deformation plus rigid-body degrees of freedom for the $k^{th}$ body $\eta(k) \in \mathfrak{R}^{n_m(k)}$—vector of modal deformation variables for the $k^{th}$ body $\Pi_r^j(k) \in \mathfrak{R}^6$—modal spatial displacement vector for the $r^{th}$ mode at the $j_k^{th}$ nodal reference frame $\Pi^j(k)=[\Pi_1^j(k), \ldots, \Pi_{n_m(k)}^j(k)] \in \mathfrak{R}^{6\times n_m(k)}$—modal spatial influence vector for the $j_k^{th}$ node. The spatial deformation of node $j_k$ is given by $u(j_k)=\Pi^j(k)\eta(k)$.

$\Pi(k)=$col$\{\Pi^j(k)\} \in \mathfrak{R}^{6n_s(k)\times n_m(k)}$—the modal matrix for the $k^{th}$ body. The $r^{th}$ column of $\Pi(k)$ is denoted $\Pi_r(k) \in \mathfrak{R}^{6n_s(k)}$ and is the mode shape function for the $r^{th}$ assumed mode for the $k^{th}$ body. The deformation field for the $k^{th}$ body is given by $u(k)=\Pi(k)\eta(k)$, while $\overset{\circ}{u}(k)=\Pi(k)\dot{\eta}(k)$.

$M_m(k) \in \mathfrak{R}^{\mathcal{N}(k)\times\mathcal{N}(k)}$—modal mass matrix for the $k^{th}$ body.

$K_m(k) \in \mathfrak{R}^{\mathcal{N}(k)\times\mathcal{N}(k)}$—modal stiffness matrix for the $k^{th}$ body.

Multibody Data

N—number of bodies in the serial flexible multibody system $$\overline{\mathcal{N}} = \sum_{k=1}^{N} \mathcal{N}(k).$$

overall degrees of freedom in the serial chain obtain by disregarding the hinge constraints $n_r(k)$—number of degrees of freedom for the $k^{th}$ hinge $\mathcal{N}(k)=n_m(k)+n_r(k)$—number of deformation plus hinge degrees of freedom for the $k^{th}$ body $$\mathcal{N} = \sum_{k=1}^{N} \mathcal{N}(k).$$

overall deformation plus hinge degrees of freedom for the serial chain.

$d_k$—node on the $k^{th}$ body to which the $k^{th}$ hinge is attached $t_k$—node on the $k^{th}$ body to which the $(k-1)^{th}$ hinge is attached $\mathcal{O}_k^-$—reference frame for the $k^{th}$ hinge on the $k^{th}$ body. This frame is fixed to node $d_k$.

$\mathcal{O}_k^+$—reference frame for the $k^{th}$ hinge on the $(k+1)^{th}$ body. This frame is fixed to node $t_{k+1}$.

$\theta(k) \in \mathfrak{R}^{n_r(k)}$—vector of configuration variables for the $k^{th}$ hinge $\beta(k) \in \mathfrak{R}^{n_r(k)}$—vector of generalized velocities for the $k^{th}$ hinge $$\Delta_v(k) = \begin{pmatrix} \Delta_\omega(k) \\ \Delta_v(k) \end{pmatrix} \in \mathfrak{R}^6.$$

relative spatial velocity for the $k^{th}$ hinge defined as the spatial velocity of frame $\mathcal{O}_k^-$ with respect to frame $\mathcal{O}_k^+$ $H^*(k) \in \mathfrak{R}^{6\times n_r(k)}$—joint map matrix for the $k^{th}$ hinge, whose columns comprise the unit vectors of the hinge. We have that $\Delta_V(k)=H^*(k)\beta(k)$.

$$\theta(k) = \begin{pmatrix} \eta(k) \\ \theta(k) \end{pmatrix} \in \Re^{\mathcal{N}(k)}.$$

vector of (deformation plus hinge) generalized configuration variables for the $k^{th}$ body $$\chi(k) = \begin{pmatrix} \dot{\eta}(k) \\ \beta(k) \end{pmatrix} \in \Re^{\mathcal{N}(k)}.$$

vector of (deformation plus hinge) generalized velocities for the $k^{th}$ body $$V(k) = V(\bar{t}_k) = \begin{pmatrix} \omega(k) \\ v(k) \end{pmatrix} \in \Re^6.$$

spatial velocity of the $k^{th}$ body reference frame $\mathcal{F}_k$, with $\omega(k)$ and $v(k)$ denoting the angular and linear velocities respectively of frame $\mathcal{F}_k$ $V(\mathcal{O}_k) \in \Re^6$—spatial velocity of frame $\mathcal{O}_k$ $V(\mathcal{O}_k^+) \in \Re^6$—spatial velocity of frame $\mathcal{O}_k^+$ $V_s(j_k) \in \Re^6$—spatial velocity of the $j^{th}$ node on the $k^{th}$ body.

$\alpha_s(j_k) \in \Re^6$—spatial acceleration of the $j^{th}$ node on the $k^{th}$ body.

$$V_m(k) = \begin{pmatrix} \dot{\eta}(k) \\ V(k) \end{pmatrix} \in \Re^{\overline{\mathcal{N}}(k)}.$$

modal spatial velocity of the $k^{th}$ body $\alpha_m(k) = \dot{V}_m(k) \in \Re^{\overline{\mathcal{N}}(k)}$—modal spatial acceleration of the $k^{th}$ body $a_m(k) \in \Re^{\overline{\mathcal{N}}(k)}$—modal Coriolis and centrifugal accelerations for the $k^{th}$ body $b_m(k) \in \Re^{\overline{\mathcal{N}}(k)}$—modal gyroscopic forces for the $k^{th}$ body $f_m(k) \in \Re^{\overline{\mathcal{N}}(k)}$—modal spatial force of interaction between the $k^{th}$ and $(k+1)^{th}$ bodies $f_s(j_k) \in \Re^6$—spatial force at node $j_k$ $f(k) \in \Re^6$—effective spatial force at frame $\mathcal{F}_k$ $T(k) \in \Re^{\mathcal{N}(k)}$—generalized force for the $k^{th}$ body $H\mathcal{F}(k) = H(k)\phi(\mathcal{O}_k, k) \in \Re^{n_r(k) \times 6}$—joint map matrix referred to frame $\mathcal{F}_k$ for the $k^{th}$ hinge $$\mathcal{H}(k) = \begin{pmatrix} I & -[\pi^d(k)]^* \\ 0 & H^{\bar{t}}(k) \end{pmatrix} \in \Re^{\mathcal{N}(k) \times \overline{\mathcal{N}}(k)}.$$

(deformation plus hinge) modal joint map matrix for the $k^{th}$ body $$\mathcal{A}(k) = \begin{pmatrix} [\pi^t(k)]^* \\ \phi(k, t_k) \end{pmatrix} \in \Re^{\overline{\mathcal{N}}(k) \times 6}.$$

relates spatial forces and velocities between node $t_k$ and frame $\mathcal{F}_k$ $\mathcal{B}(k+1, k) = [0, \phi(t_{k+1}, k)] \in \Re^{6 \times \overline{\mathcal{N}}(k)}$—relates spatial forces and velocities between node $t_{k+1}$ and frame $\mathcal{F}_k$ $$\Phi(k+1, k) = \mathcal{A}(k+1) \mathcal{B}(k+1, k) =$$

$$\begin{pmatrix} 0 & [\pi^t(k+1)]^* \phi(t_{k+1}, k) \\ 0 & \phi(k+1, k) \end{pmatrix} \in \Re^{\overline{\mathcal{N}}(k+1) \times \overline{\mathcal{N}}(k)}.$$

the interbody transformation operator which relates modal spatial forces and velocities between the $k^{th}$ and $(k+1)^{th}$ bodies $$\mathcal{C}(k, k-1) = \begin{pmatrix} 0 \\ \vdots \\ \phi(t_k, k-1) \\ \vdots \\ 0 \end{pmatrix} \in \Re^{6 n_s(k) \times 6}$$

$B(k) = [\phi(k, 1_k), \phi(k, 2_k), \ldots, \phi(k, n_s(k))] \in \Re^{6 \times 6 n_s(k)}$—relates the spatial velocity of frame $\mathcal{F}_k$ to the spatial velocities of all the nodes on the $k^{th}$ body when the body is regarded as being rigid $\mathcal{M} \in \Re^{\mathcal{N} \times \mathcal{N}}$—the multibody system mass matrix $C \in \Re^{\mathcal{N}}$—the vector of Coriolis, centrifugal and elastic forces for the multibody system 2. Introduction The invention uses spatial operators ([1, 2]) to formulate the dynamics and develop efficient recursive algorithms for flexible multibody systems. Flexible spacecraft, limber space manipulators, and vehicles are important examples of flexible multibody systems. Key features of these systems are the large number of degrees of freedom and the complexity of their dynamics models.

Some of the goals of the invention are: (1) providing a high-level architectural understanding of the structure of the mass matrix and its inverse; (2) showing that the high-level expressions can be easily implemented within the very well understood Kalman filtering and smoothing architecture; (3) developing very efficient inverse and forward dynamics recursive algorithms; and (4) analyzing the computational cost of the new algorithms. Accomplishing these goals adds to the rapidly developing body of research in the recursive dynamics of flexible multibody systems (see [3, 4, 5]).

It is assumed that the bodies undergo small deformations so that a linear model for elasticity can be used. However, large articulation at the hinges is allowed. No special assumptions are made regarding the geometry of the component bodies. To maximize applicability, the algorithms developed here use finite-element and/or assumed-mode models for body flexibility. For notational simplicity, and without any loss in generality, the main focus of this specification is on flexible multibody serial chains. Extensions to tree and closed-chain topologies are discussed.

In Section 3 we derive the equations of motion and recursive relationships for the modal velocities, modal accelerations, and modal forces. This section also contains a derivation of the Newton-Euler Operator Factorization of the system mass matrix. A recursive Newton-Euler inverse dynamics algorithm to compute the vector of generalized forces corresponding to a given state and vector of generalized accelerations is described in Section 4.

In Section 5, the Newton-Euler factorization of the mass matrix is used to develop a partly recursive composite-body forward dynamics algorithm for computing the generalized accelerations of the system. The recursive part is for computing the multibody system mass matrix. This forward dynamics algorithm is in the vein of well-established approaches ([6, 7]) which require the explicit computation and inversion of the system mass matrix. However, the new algorithm is more efficient because the mass matrix is computed recursively and because the detailed recursive computations follow the high-level architecture (i.e. roadmap) provided by the Newton-Euler factorization.

In Section 6 we derive new operator factorization and inversion results for the mass matrix that lead to the recursive articulated-body forward dynamics algorithm. A new mass matrix operator factorization, referred to as the Innovations factorization, is developed. The individual factors in the innovations factorization are square and invertible operators. This is in contrast to the Newton-Euler factorization in which the factors are not square and therefore not invertible. The Innovations factorization leads to an operator expression for the inverse of the mass matrix. Based on this expression, in Section 7 we develop the recursive articulated body forward dynamics algorithm for the multibody system. This algorithm is an alternative to the composite-body forward dynamics algorithm and requires neither the explicit formation of the system mass matrix nor its inversion. The structure of this recursive algorithm closely resembles those found in the domain of Kalman filtering and smoothing ([8]).

In Section 8 we compare the computational costs for the two forward dynamics algorithms. It is shown that the articulated body forward dynamics algorithm is much more efficient than the composite body forward dynamics algorithm for typical flexible multibody systems. In Section 9 we discuss the extensions of the formulation and algorithms in this specification to tree and closed-chain topology multibody systems.

SUMMARY OF THE INVENTION

A robot manipulator controller for a flexible manipulator arm having plural bodies connected at respective movable hinges and flexible in plural deformation modes corresponding to respective modal spatial influence vectors relating deformations of plural spaced nodes of respective bodies to the plural deformation modes, operates by computing articulated body quantities for each of the bodies from respective modal spatial influence vectors, obtaining specified body forces for each of the bodies, and computing modal deformation accelerations of the nodes and hinge accelerations of the hinges from the specified body forces, from the articulated body quantities and from the modal spatial influence vectors. In one embodiment of the invention, the controller further operates by comparing the accelerations thus computed to desired manipulator motion to determine a motion discrepancy, and correcting the specified body forces so as to reduce the motion discrepancy.

Computing the articulated body quantities is carried out for each body beginning at the outermost body by computing a modal mass matrix, computing an articulated body inertia from the articulated body inertia of a previous body and from the modal mass matrix, computing an articulated hinge inertia from the articulated body inertia, computing an articulated body to hinge force operator from the articulated hinge inertia, computing a null force operator from the articulated body to hinge force operator. This is followed by revising the articulated body inertia by transforming it by the null force operator.

The manipulator bodies and hinges are characterized by respective vectors of deformation and hinge configuration variables, and computing modal deformation accelerations and hinge accelerations is carried out for each one of the bodies beginning with the outermost body by computing a residual body force from a residual body force of a previous body and from the vector of deformation and hinge configuration variables, computing a resultant hinge acceleration from the body force, the residual body force and the articulated hinge inertia, and then, for each one of the bodies beginning with the innermost body, by computing a modal body acceleration from a modal body acceleration of a previous body, computing a modal deformation acceleration and hinge acceleration from the resulting hinge acceleration and from the modal body acceleration transformed by the body to hinge force operator.

Computing a resultant hinge force is followed by revising the residual body force by the resultant hinge force transformed by the body to hinge force operator, and computing a modal deformation acceleration and hinge acceleration is followed by revising the modal body acceleration based upon the deformation and hinge acceleration. The computing is performed cyclically in a succession of time steps, and the vector of deformation and hinge configuration variables is computed from the modal deformations and hinge accelerations of a previous time step, or is derived by reading robot joint sensors in real time.

In a preferred embodiment, the articulated body inertia, the articulated hinge inertia, the body to hinge force operator, the null force operator, the body force, the residual body force, the resultant hinge acceleration and the resultant hinge force are each partitioned into free and rigid versions. This embodiment operates by computing the flexible version of the resultant hinge force from the applied body force, and computing the flexible version of the residual body force and from the rigid version of the residual body force transformed by the modal spatial influence vector. The articulated body inertia is decomposed into rigid-free and rigid-rigid coupling components, and the rigid version of the residual body force is revised based upon a function of the rigid-rigid and rigid-free coupling components of the articulated body inertia and a flexible version of the articulated body inertia. This embodiment decomposes the manipulator's modal mass matrix into rigid-free and rigid-rigid coupling components and computes the rigid-rigid and rigid-free coupling components of the articulated body inertia from respective ones of the rigid-rigid and rigid-free coupling components of the modal mass matrix.

In this embodiment, free and rigid versions of a deformation and hinge modal joint map matrix are computed for each body so that the flexible version of the articulated hinge inertia is computed from the articulated body inertia transformed by the flexible version of the corresponding deformation and hinge modal joint map matrix, the rigid version of the articulated body inertia is computed from a function of the rigid-rigid and rigid-free coupling components of the articulated body inertia transformed by the flexible version of the corresponding deformation and hinge modal joint map matrix, the rigid version of the articulated hinge inertia is computed from the rigid version of the articulated body inertia, and the rigid version of the body to hinge force operator is computed from the rigid versions of the articulated body inertia and the articulated hinge inertia. The free and rigid versions of the deformation and hinge modal joint map matrix are formed by computing a joint map matrix corresponding to unit vectors of the hinges and computing the deformation and hinge modal joint map matrix from the joint map matrix and from the modal spatial influence vector.

In this embodiment, the flexible version of the resulting hinge acceleration is computed from the flexible versions of the articulated hinge inertia and resulting hinge force, and the rigid version of the resulting hinge acceleration is computed from the rigid versions of the articulated hinge inertia and resulting hinge force. The residual body force is revised in this embodiment by adding to the residual body force a product of the rigid versions of the resultant hinge force and the body to hinge force operator.

DETAILED DESCRIPTION OF THE INVENTION

3. Equations of Motion for Flexible Serial Chains

In this section, we develop the equations of motion for a serial flexible multibody system with N flexible bodies. Each flexible body is assumed to have a lumped mass model consisting of a collection of nodal rigid bodies. Such models are typically developed using standard finite element structural analysis software. The number of nodes on the $k^{th}$ body is denoted $n_s(k)$. The $j^{th}$ node on the $k^{th}$ body is referred to as the $j_k^{th}$ node. Each body has associated with it a body reference frame, denote $\mathcal{F}_k$ for the $k^{th}$ body. The deformations of the nodes on the body are described with respect to this body reference frame, while the rigid body motion of the $k^{th}$ body is characterized by the motion of frame $\mathcal{F}_k$.

The 6-dimensional spatial deformation (slope plus translational) of node $j_k$ (with respect to frame $\mathcal{F}_k$) is denoted $u(j_k) \in \Re^6$. The overall deformation field for the $k^{th}$ body is defined as the vector $u(k)=\text{col}\{u(j_k)\} \in \Re^{6n_s(k)}$. The vector from frame $\mathcal{F}_k$ to the reference frame on node $j_k$ is denoted $l(k,j_k) \in \Re^3$.

With $M_s(k_k) \in \Re^{6\times 6}$ denoting the spatial inertia of the $j^{th}$ node, the structural mass matrix for the $k^{th}$ body $M_s(k)$ is the block diagonal matrix $\text{diag}\{M_s(j_k)\} \in \Re^{6n_s(k)\times 6n_s(k)}$. The structural stiffness matrix is denoted $K_s(k) \in \Re^{6n_s(k)\times 6n_s(k)}$. Both $M_s(k)$ and $K_s(k)$ are typically generated using finite element analysis.

Figure 1A:
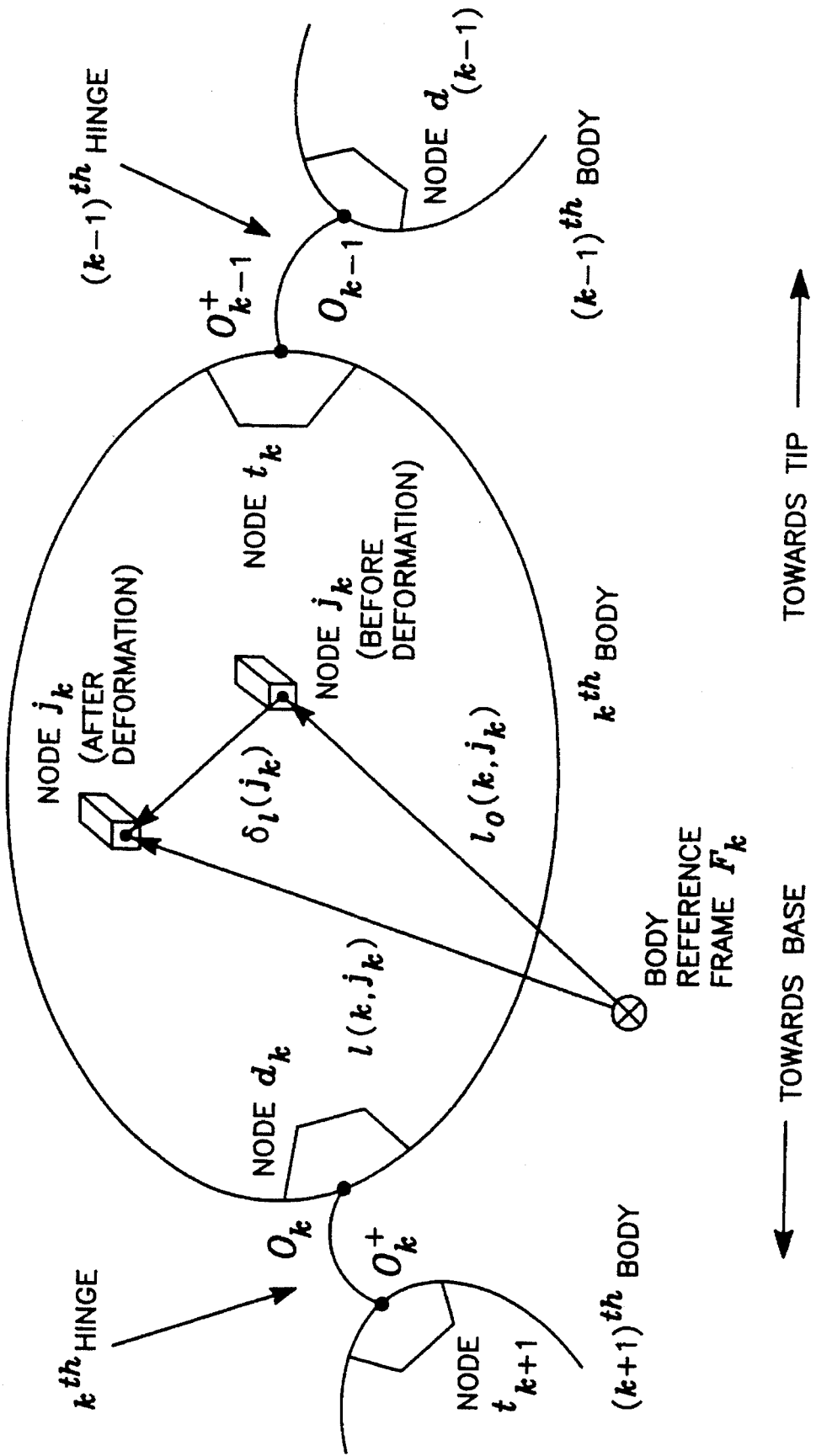
FIG. 1a is a simplified diagram of a portion of a robot manipulator having flexible links, and illustrating the coordinate system employed in one embodiment of the invention.

As shown in FIG. 1a, the bodies in the serial chain are numbered in increasing order from tip to base. We use the terminology inboard (outboard) to denote the direction along the serial chain towards (away from) the base body. The $k^{th}$ body is attached on the inboard side to the $(k+1)^{th}$ body via the $k^{th}$ hinge, and on the outboard side to the $(k-1)^{th}$ body via the $(k-1)^{th}$ hinge. On the $k^{th}$ body, the node to which the outboard hinge (the $(k-1)^{th}$ hinge) is attached is referred to as node $t_k$, while the node to which the inboard hinge (the $k^{th}$ hinge) is attached is denoted node $d_k$. Thus the $k^{th}$ hinge couples together nodes $d_k$ and $t_{k+1}$. Attached to each of these pair of adjoining nodes are the $k^{th}$ hinge reference frames denoted $\mathcal{O}_k$ and $\mathcal{O}_k^+$, respectively. The number of degrees of freedom for the $k^{th}$ hinge is denoted $n_r(k)$. The vector of configuration variables for the $k^{th}$ hinge is denoted $\theta(k) \in \Re^{n_r(k)}$, while its vector of generalized speeds is denoted $\beta(k) \in \Re^{n_r(k)}$. In general, when there are nonholonomic hinge constraints, the dimensionality of $\beta(k)$ may be less than that of $\theta(k)$. For notational convenience, and without any loss generality, it is assumed here that the dimensions of the vectors $\theta(k)$ and $\beta(k)$ are equal. In most situations, $\beta(k)$ is simply $\dot\theta$. However there are many cases where the use of quasi-coordinates simplifies the dynamical equations of motion and an alternative choice for $\beta(k)$ may be preferable. The relative spatial velocity $\Delta_v(k)$ across the hinge is given by $H^*(k)\beta(k)$, where $H^*(k)$ denotes the joint map matrix for the $k^{th}$ hinge.

Assumed modes are typically used to represent the deformation of flexible bodies, and there is a large body of literature dealing with their proper selection. There is however a close relationship between the choice of a body reference frame and the type of assumed modes. The complete motion of the flexible body is contained in the knowledge of the motion of the body reference frame and the deformation of the body as seen from this body frame. In the multibody context, it is often convenient to choose the location of the $k^{th}$ body reference frame $\mathcal{F}_k$ as a material point on the body and fixed to node $d_k$ at the inboard hinge. For this choice, the assumed modes are cantilever modes and node $d_k$ exhibits zero deformation ($u(d_k)=0$). Free-free modes are also used for representing body deformation and are often preferred for control analysis and design. For these modes, the reference frame $\mathcal{F}_k$ is not fixed to any node, but is rather assumed to be fixed to the undeformed body, and as a result all nodes exhibit nonzero deformation. The dynamics modeling and algorithms developed here handle both types of modes, with some additional computational simplifications arising from Eq. (1) when cantilever modes are used. For a related discussion regarding the choice of reference frame and modal representations for a flexible body see [9].

We assume here that a set of $n_m(k)$ assumed modes has been chosen for the $k^{th}$ body. Let $\Pi_r^j(k) \in \Re^6$ denote the modal spatial displacement vector at the $j_k^{th}$ node for the $r^{th}$ mode. The modal spatial displacement influence vector $\Pi^j(k) \in \Re^{6\times n_m(k)}$ for the $j_k^{th}$ node and the modal matrix $\Pi(k) \in \Re^{6n_s(k)\times n_m(k)}$ for the $k^{th}$ body are defined as follows:

$$\Pi^j(k)=[=\Pi_1^j(k),\ldots \Pi_{n_m(k)}^j(k)] \text{ and } \Pi(k)=\text{col}\{\Pi^j(k)\}$$

The $r^{th}$ column of $\Pi(k)$ is denoted $\Pi_r(k)$ and defines the mode shape for the $r^{th}$ assumed mode for the $k^{th}$ body. Note that for cantilever modes we have $$\Pi_r^d(k)=0 \text{ for } r=1\ldots n_m(k) \qquad (1)$$

With $\eta(k) \in \Re^{n_m(k)}$ denoting the vector of modal deformation variables for the $k^{th}$ body, the spatial deformation of node $j_k$ and the spatial deformation field $u(k)$ for the $k^{th}$ body are given by $$u(j_k)=\Pi^j(k)\eta(k) \text{ and } u(k)=\Pi(k)\eta(k) \qquad (2)$$

The vector of generalized configuration variables v(k) and generalized speeds X(k) for the $k^{th}$ body are defined as $$\theta(k) \triangleq \begin{pmatrix} \eta(k) \\ \theta(k) \end{pmatrix} \in \Re^{\mathcal{N}(k)} \text{ and } \chi(k) \triangleq \begin{pmatrix} \dot{\eta}(k) \\ \beta(k) \end{pmatrix} \in \Re^{\mathcal{N}(k)} \quad (3)$$

where $\mathcal{N}(k) \triangleq n_m(k) + n_r(k)$. The overall vectors of generalized configuration variables v and generalized speeds X for the serial multibody system are given by $$v \triangleq \text{col}\{v(k)\} \in \Re^{\mathcal{N}} \text{ and } X \triangleq \text{col}\{X(k)\} \in \Re^{\mathcal{N}} \quad (4)$$

where $$\mathcal{N} \triangleq \sum_{k=1}^{N} \mathcal{N}(k)$$

denotes the overall number of degrees of freedom for the multibody system. The state of the multibody system is defined by the pair of vectors $\{v, X\}$. For a given system state $\{v, X\}$, the equations of motion define the relationship between the vector of generalized accelerations $\dot{X}$ and the vector of generalized forces $T \in \Re^{\mathcal{N}}$ for the system. The inverse dynamics problem consists of computing the vector of generalized forces T for a prescribed set of generalized accelerations $\dot{X}$. The forward dynamics problem is the converse one and consists of computing the set of generalized accelerations $\dot{X}$ resulting from a set of generalized forces T. The equations of motion for the system are developed in the remained of this section.

3.1 Recursive Propagation of Velocities

Let $V(k) \in \Re^6$ denote the spatial velocity of the $k^{th}$ body reference frame $\mathcal{F}_k$. The spatial velocity $V_s(t_{k+1}) \in \Re^6$ of node $t_{k+1}$ (on the inboard of the $k^{th}$ hinge) is related to the spatial velocity $V(k+1)$ of the $(k+1)^{th}$ body reference frame $\mathcal{F}_{k+1}$, and the modal deformation variable rates $\eta(k+1)$ as follows:

$$V_s(t_{k+1}) = \phi^*(k+1, t_{k+1})V(k+1) + \overset{\circ}{u}(t_{k+1}) \quad (5)$$
$$= \phi^*(k+1, t_{k+1})V(k+1) + \pi^t(k+1)\eta(k+1)$$

The spatial transformation operator $\phi(x,y) \in \Re^{6 \times 6}$ above is defined to be $$\phi(x,y) = \begin{pmatrix} I & \tilde{l}(x,y) \\ 0 & I \end{pmatrix} \quad (6)$$

where $l(x,y) \in \Re^3$ denotes the vector between the points x and y. Note that the following important (group) property holds:

$$\phi(x,y)\phi(y,z) = \phi(x,z)$$

for arbitrary points x, y and z. As in Eq. (5), and throughout this specification, the index k will be used to refer to both the $k^{th}$ body as well as to the $k^{th}$ body reference frame $\mathcal{F}_k$ with the specific usage being evident from the context. Thus for instance, V(k) and $\phi(k, t_k)$ are the same as $V(\mathcal{F}_k)$, and $\phi(\mathcal{F}_k, t_k)$ respectively.

The spatial velocity $V(\mathcal{O}_k^+)$ of frame $\mathcal{O}_k^+$ (on the inboard side of the $k^{th}$ hinge) is related to $V_s(t_{k+1})$ via $$V(\mathcal{O}_k^+) = \phi^*(t_{k+1}, \mathcal{O}_k)V_s(t_{k+1}) \quad (7)$$

Since the relative spatial velocity $\Delta_v(k)$ across the $k^{th}$ hinge is given by $H^*(k)\beta(k)$, the spatial velocity $V(\mathcal{O}_k)$ of frame $\mathcal{O}_k$ on the outboard side of the $k^{th}$ hinge is $$V(\mathcal{O}_k) = V(\mathcal{O}_k^+) + H^*(k)\beta(k) \quad (8)$$

The spatial velocity V(k) of the $k^{th}$ body reference frame is given by $$V(k) = \phi^*(\mathcal{O}_k, k)V(\mathcal{O}_k) - \overset{\circ}{u}(d_k) \quad (9)$$
$$= \phi^*(\mathcal{O}_k, k)V(\mathcal{O}_k) - \pi^d(k)\eta(k)$$

Putting together Eq. (5), Eq. (7), Eq. (8) and Eq. (3.1), it follows that $$V(k) = \phi^*(k+1,k)V(k+1) + \phi^*(k_{k+1},k)\Pi^t(k+1)\eta(k+1) + \phi^*(\mathcal{O}_k,k)H^*(k)\beta(k) - \Pi^d(k)\eta(k) \quad (10)$$

Thus, with $\overline{\mathcal{N}}(k) \triangleq n_m(k) + 6$, and using Eq. (10), the modal spatial velocity $V_m(k) \in \Re^{\overline{\mathcal{N}}(k)}$ for the $k^{th}$ body is given by $$V_m(k) \triangleq \begin{pmatrix} \dot{\eta}(k) \\ V(k) \end{pmatrix} = \Phi^*(k+1,k)V_m(k+1) + \mathcal{H}^*(k)\chi(k) \in \Re^{\overline{\mathcal{N}}(k)} \quad (11)$$

where the interbody transformation operator $\Phi(\cdot,\cdot)$ and the modal joint map matrix $\mathcal{H}(k)$ are defined as $$\Phi(k+1,k) \triangleq \begin{pmatrix} 0 & [\pi^t(k+1)]^*\phi(t_{k+1},k) \\ 0 & \phi(k+1,k) \end{pmatrix} \in \Re^{\overline{\mathcal{N}}(k+1) \times \overline{\mathcal{N}}(k)} \quad (12)$$

$$\mathcal{H}(k) \triangleq \begin{pmatrix} I & -[\pi^d(k)]^* \\ 0 & H\overline{\mathcal{F}}(k) \end{pmatrix} \in \Re^{\mathcal{N}(k) \times \overline{\mathcal{N}}(k)} \quad (13)$$

where $$H\mathcal{F}(k) \triangleq H(k)\phi(\mathcal{O}_k, k) \in \Re^{n_r(k) \times 6}$$

Note that $$\Phi(k+1,k) = \mathcal{A}(k+1)\mathcal{B}(k+1,k) \quad (14)$$

where $$\mathcal{A}(k) \triangleq \begin{pmatrix} [\pi^t(k)]^* \\ \phi(k, t_k) \end{pmatrix} \in \Re^{\overline{\mathcal{N}}(k) \times 6} \quad (15)$$

and $$\mathcal{B}(k+1,k) \triangleq [0, \phi(t_{k+1},k)] \in \Re^{6 \times \overline{\mathcal{N}}(k)}$$

Also, the modal joint map matrix $\mathcal{H}(k)$ can be partitioned as $$\mathcal{H}(k) = \begin{pmatrix} \mathcal{H}_f(k) \\ \mathcal{H}_r(k) \end{pmatrix} \in \Re^{\mathcal{N}(k) \times \overline{\mathcal{N}}(k)} \quad (16)$$

where $$\mathcal{H}_f(k) \triangleq [I, -[\Pi^d(k)]^*] \in \Re^{n_m(k) \times \overline{\mathcal{N}}(k)} \text{ and } \mathcal{H}_r(k) \triangleq [0, H(k)\phi(\mathcal{O}_k, k)] \in \Re^{n_r(k) \times \overline{\mathcal{O}}(k)} \quad (17)$$

With $$\overline{\mathcal{N}} = \sum_{k=1}^{N} \overline{\mathcal{N}}(k),$$

we define the spatial operator $\mathcal{E}_\Phi$ as $$\mathcal{E}_\Phi \triangleq \begin{pmatrix} 0 & 0 & 0 & 0 & 0 \\ \Phi(2,1) & 0 & \cdots & 0 & 0 \\ 0 & \Phi(3,2) & \cdots & 0 & 0 \\ \vdots & & & & \vdots \\ 0 & 0 & \cdots & \Phi(N,N-1) & 0 \end{pmatrix} \in \Re^{\overline{\mathcal{N}} \times \overline{\mathcal{N}}} \quad (18)$$

Using the fact that $\varepsilon_\Phi$ is nilpotent (i.e. $\varepsilon_\Phi^N=0$), we define the spatial operator $\Phi$ as $$\Phi \triangleq [I - \varepsilon_\Phi]^{-1} = \qquad (19)$$

$$I + \varepsilon_\Phi + \ldots + \varepsilon_\Phi^{N-1} =$$

$$\begin{pmatrix} I & 0 & \ldots & 0 \\ \Phi(2,1) & I & \ldots & 0 \\ \cdot & \cdot & \cdot & \cdot \\ \cdot & \cdot & \cdot & \cdot \\ \cdot & \cdot & \cdot & \cdot \\ \Phi(N,1) & \Phi(N,2) & \ldots & I \end{pmatrix} \in \Re^{\mathcal{N} \times \mathcal{N}}$$

where $$\Phi(i,j) \triangleq \Phi(i,i-1) \ldots \Phi(j+1,j) \text{ for } i > j$$

Also define the spatial operator $\mathcal{H} \triangleq \text{diag}\{\mathcal{H}(k)\} \in \Re^{\mathcal{N} \times \mathcal{N}}$. Using these spatial operators, and defining $V_m \triangleq \text{col}\{V_m(k)\} \in \Re^{\mathcal{N}}$, from Eq. (11) it follows that the spatial operator expression for $V_m$ is given by $$V_m = \Phi^* \mathcal{H}^* X \qquad (20)$$

3.2 Modal Mass Matrix for a Single Body

With $V_s(j_k) \in \Re^6$ denoting the spatial velocity of node $j_k$, and $V_s(k) \triangleq \text{col}\{V_s(j_k)\} \in \Re^{6n_s(k)}$ the vector of all nodal spatial velocities for the $k^{th}$ body, it follows (see Eq. (5)) that $$V_s(k) = B^*(k)V(k) + \overset{u}{}(k) = [\Pi(k), B^*(k)]V_m(k) \qquad (21)$$

where $$B(k) \triangleq [\phi(k,1_k), \phi(k,2_k), \ldots \phi(k,n_s(k))] \in \Re^{6 \times 6n_s(k)} \qquad (22)$$

Since $M_s(k)$ is the structural mass matrix of the $k^{th}$ body, and using Eq. (21), the kinetic energy of the $k^{th}$ body can be written in the form $$\tfrac{1}{2}V_s^*(k)M_s(k)V_s(k) = \tfrac{1}{2}V_m^*(k)M_m(k)V_m(k) \qquad (23)$$

where $$M_m(k) \triangleq \begin{pmatrix} \Pi^*(k) \\ B(k) \end{pmatrix} M_s(k)[\Pi(k), B^*(k)] =$$

$$\begin{pmatrix} \Pi^*(k)M_s(k)\Pi(k) & \Pi^*(k)M_s(k)B^*(k) \\ B(k)M_s(k)\Pi(k) & B(k)M_s(k)B^*(k) \end{pmatrix}$$

$$= \begin{pmatrix} M_m^{ff}(k) & M_m^{fr}(k) \\ M_m^{rf}(k) & M_m^{rr}(k) \end{pmatrix} \in \Re^{\mathcal{N}(k) \times \mathcal{N}(k)}$$

Corresponding to the generalized speeds vector $X(k)$, $M_m(k)$ as defined above is the modal mass matrix of the $k^{th}$ body. In the block partitioning in Eq. (23), the superscripts $f$ and $r$ denote the flexible and rigid blocks respectively. Thus $M_m^{ff}(k)$ represents the flex/flex coupling block, white $M_m^{fr}(k)$ the flex/rigid coupling block of $M_m(k)$. We will use this notational convention through this specification. This partitioning is readily carried out by simply recognizing that the $M_m^{ff}(k)$ block is a square matrix of dimensionality equal to the number of deformation modes while the $M_m^{rr}(k)$ block is a square 6-by-6 matrix. Note that $M_m^{rr}(k)$ is precisely the rigid body spatial inertia of the $k^{th}$ body. Indeed, $M_m(k)$ reduces to the rigid body spatial inertia when the body flexibility is ignored, i.e., no modes are used, since in this case $n_m(k)=0$ (and $\Pi(k)$ is null).

Since the vector $l(k,j_k)$ from $\mathcal{F}_k$ to node $j_k$ depends on the deformation of the node, the operator $B(k)$ is also deformation dependent. From Eq. (23) it follows that while the block $M_m^{ff}(k)$ is deformation independent, both the blocks $M_m^{fr}(k)$ and $M_m^{rr}(k)$ are deformation dependent. The detailed expression for the modal mass matrix can be defined using modal integrals which are computed as a part of the finite-element structural analysis of the flexible bodies. These expressions for the modal integrals and the modal mass matrix of the $k^{th}$ body can be found in [10]. Often the deformation dependent parts of the modal mass matrix are ignored, and free-free eigen-modes are used for the assumed modes $\Pi(k)$. When this is the case, $M_m^{fr}(k)$ is zero and $M_m^{ff}(k)$ is block diagonal.

3.3 Recursive Propagation of Accelerations

Differentiating the velocity recursive equation, Eq. (11), we obtain the following recursive expression for the modal spatial acceleration $\alpha_m(k) \in \Re^{\mathcal{N}}(k)$ for the $k^{th}$ body:

$$\alpha_m(k) \triangleq \dot{V}_m(k) = \begin{pmatrix} \ddot{\eta}(k) \\ \alpha(k) \end{pmatrix} = \qquad (24)$$

$$\Phi^*(k+1,k)\alpha_m(k+1) + \mathcal{H}^*(k)\dot{\chi}(k) + a_m(k)$$

where $\alpha(k) = \dot{V}(k)$, and the Coriolis and centrifugal acceleration term $a_m(k) \in \Re^{\mathcal{N}}(k)$ is given by $$a_m(k) = \frac{d\Phi^*(k+1,k)}{dt} V_m(k+1) + \frac{d\mathcal{H}^*(k)}{dt} \chi(k) \qquad (25)$$

The detailed expressions for $a_m(k)$ can be found in [10]. Defining $a_m = \text{col}\{a_m(k)\} \in \Re^{\mathcal{N}}$ and $\alpha m_m = \text{col}\{\alpha_m(k)\} \in \Re^{\mathcal{N}}$, and using spatial operators we can rexpress Eq. (24) in the form $$\alpha_m = \Phi^*(\mathcal{H}^*\dot{X} + a_m) \qquad (26)$$

The vector of spatial accelerations of all the nodes for the $k^{th}$ body, $\alpha_s(k) \triangleq \text{col}\{\alpha_s(j_k)\} \in \Re^{6n_s(k)}$, is obtained by differentiating Eq. (21):

$$\alpha_s(k) = \dot{V}_s(k) = [\Pi(k), B^*(k)]\alpha_m(k) + a(k) \qquad (27)$$

where $$a(k) \triangleq \text{col}\{a(j_k)\} = \frac{d[\Pi(k), B^*(k)]}{dt} V_m(k) \in \Re^{6n_s(k)} \qquad (28)$$

3.4 Recursive Propagation of Forces

Let $f(k-1) \in \Re^6$ denote the effective spatial force of interaction, referred to frame $\mathcal{F}_{k-1}$, between the $k^{th}$ and $(k-1)^{th}$ bodies across the $(k-1)^{th}$ hinge. Recall that the $(k-1)^{th}$ hinge is between node $t_k$ on the $k^{th}$ body and node $d_{k-1}$ on the $(k-1)^{th}$ body. With $f_s(j_k) \in \Re^6$ denoting the spatial force at a node $j_k$, the force balance equation for node $t_k$ is given by $$f_s(t_k) = \phi(t_k, k-1)f(k-1) + M_s(t_k)\alpha_s(t_k) + b(t_k) + f_K(t_k) \qquad (29)$$

For all nodes other than node $t_k$ on the $k^{th}$ body, the force balance equation is of the form $$F_s(j_k) = M_s(j_k)\alpha_s(j_k) + b(j_k) + f_K(j_k) \qquad (30)$$

In the above $f_K(k) = K_s(k)u(k) \in \Re^{6n_s(k)}$ denotes the vector of spatial elastic strain forces for the nodes on the $k^{th}$ body, while $b(j_k) \in \Re^6$ denotes the spatial gyroscopic force for the node $j_k$ and is given by $$b(j_k) = \begin{pmatrix} \tilde{\omega}(j_k)^T(j_k)\omega(j_k) \\ m(j_k)\tilde{\omega}(j_k)\tilde{\omega}(j_k)p(j_k) \end{pmatrix} \in \Re^6 \quad (31)$$

where $\omega(j_k) \in \Re^3$ notes the angular velocity of node $j_k$. Collecting together the above equations and defining $$C(k,k-1) \triangleq \begin{pmatrix} 0 \\ \vdots \\ \phi(t_k, k-1) \\ \vdots \\ 0 \end{pmatrix} \in \Re^{6n_s(k) \times 6} \quad (32)$$

and $$b(k) \triangleq col\{b(j_k)\} \in \Re^{6n_s(k)}$$

it follows from Eq. (29) and Eq. (30) that $$f_s(k) = C(k,k-1)f(k-1) + M_s(k)\alpha_s(k) + b(k) + K_s(k)u(k) \quad (33)$$

where $f_s(k) \triangleq col\{f_s(j_k)\} \in \Re^{6n_s(k)}$. Noting that $$f(k) = B(k)f_s(k) \quad (34)$$

and using the principle of virtual work, it follows from Eq. (21) that the modal spatial forces $f_m(K) \in \Re \bar{N}(k)$ for the $k^{th}$ body are given by $$f_m(k) \triangleq \begin{pmatrix} \Pi^*(k) \\ B(k) \end{pmatrix} f_s(k) = \begin{pmatrix} \Pi^*(k)f_s(k) \\ f(k) \end{pmatrix} \quad (35)$$

Premultiplying Eq. (33) by $$\begin{pmatrix} \Pi^*(k) \\ B(k) \end{pmatrix}$$

and using Eq. (23), Eq. (27), and Eq. (35) leads to the following recursive relationship for the modal spatial forces:

$$\begin{aligned} f_m(k) &= \begin{pmatrix} \Pi^*(k)C(k,k-1) \\ B(k)C(k,k-1) \end{pmatrix} f(k-1) + M_m(k)\alpha_m(k) + \\ & \quad b_m(k) + K_m(k)\theta(k) \\ &= \begin{pmatrix} [\Pi'(k)]^* \\ \phi(k,t_k) \end{pmatrix} \phi(t_k, k-1)f(k-1) + M_m(k)\alpha_m(k) + \\ & \quad b_m(k) + K_m(k)\theta(k) \\ &= \Phi(k,k-1)f_m(k-1) + M_m(k)\alpha_m(k) + \\ & \quad b_m(k) + K_m(k)\theta(k) \end{aligned} \quad (36)$$

Here we have defined $$b_m(k) \triangleq \begin{pmatrix} \Pi^*(k) \\ B(k) \end{pmatrix} [b(k) + M_s(k)a(k)] \in \Re \bar{N}(k) \quad (37)$$

and the modal stiffness matrix $$K_m(k) \triangleq \begin{pmatrix} \Pi^*(k)K_s(k) & (k) & 0 \\ 0 & & 0 \end{pmatrix} \in \Re \bar{N}(k) \times \bar{N}(k) \quad (38)$$

The expression for $K_m(k)$ in Eq. (38) uses the fact that the columns of $B^*(k)$ are indeed the deformation dependent rigid body modes for the $k^{th}$ body and hence they do not contribute to its elastic strain energy. Indeed, when a deformation dependent structural stiffness matrix $K_s(k)$ is used, we have that $$K_s(k)B^*(k) = 0 \quad (39)$$

However the common practice (also followed here) of using a constant, deformation-independent structural stiffness matrix leads to the anomalous situation wherein Eq. (39) does not hold exactly. We ignore these fictitious extra terms on the left-hand side of Eq. (39).

The velocity-dependent bias term $b_m(k)$ is formed using modal integrals generated by standard finite-element programs, and a detailed expression for it is given in [10]. From Eq. (36), the operator expression for the modal spatial forces $f_m \triangleq col\{f_m(k)\} \in \Re \bar{N}$ for all the bodies in the chain is given by $$f_m = \Phi(M_m\alpha_m + b_m + K_m v) \quad (40)$$

where $$M_m \triangleq diag\{M_m(k)\} \in \Re \bar{N} \times \bar{N}, K_m \triangleq diag\{K_m(k)\} \in \Re \bar{N} \times \bar{N},$$

and $b_m \triangleq col\{b_m(k)\} \in \Re \bar{N}$

From the principle of virtual work, the generalized forces vector $T \in \Re \mathcal{N}$ for the multibody system is given by the expression $$T = \mathcal{H} f_m \quad (41)$$

3.5 Operator Expression for the System Mass Matrix

Collecting together the operator expressions in Eq. (20), Eq. (26), Eq. (40) and Eq. (41) we have:

$$V_m = \Phi^* \mathcal{H}^* \chi \quad (42)$$
$$\alpha_m = \Phi^*(\mathcal{H}^* \dot{\chi} + a_m)$$
$$f_m = \Phi(M_m\alpha_m + b_m + K_m\theta) = \Phi M_m\Phi^* \mathcal{H}^* \dot{\chi} + \Phi(M_m\Phi^* a_m + b_m + K_m v)$$

$$T = \mathcal{H} f_m = \mathcal{H}\Phi M_m\Phi^* \mathcal{H}^*\dot{\chi} + \Phi(M_m\Phi^* a_m + b_m)$$
$$= \mathcal{M}\dot{\chi} + C$$

where $$\mathcal{M} \triangleq \mathcal{H}\Phi M_m\Phi^* \mathcal{H}^* \in \Re \mathcal{N} \times \mathcal{N} \text{ and } C \triangleq \mathcal{H}\Phi(M_m\Phi^* a_m + b_m + K_m v) \in \Re \mathcal{N} \quad (43)$$

Here $\mathcal{M}$ is the system mass matrix for the serial chain and the expression $\mathcal{H}\Phi M_m\Phi^* \mathcal{H}^*$ is referred to as the Newton-Euler Operator Factorization of the mass matrix. $C$ is the vector of Coriolis, centrifugal, and elastic forces for the system.

It is noteworthy that the operator expressions for $\mathcal{M}$ and $C$ are identical in form to those for rigid multibody systems (see [1, 11]). Indeed, the similarity is more than superficial, and the key properties of the spatial operators that are used in the analysis and algorithm development for rigid multibody systems also hold for the spatial operators defined here. As a consequence, a large part of the analysis and algorithms for rigid multibody systems can be easily carried over and applied to flexible multibody systems. This is the approach adopted here.

4. Inverse Dynamics Algorithm

This section describes a recursive Newton-Euler inverse dynamics algorithm for computing the generalized forces T, for a given set of generalized accelerations $\dot{X}$ and system state $\{v, X\}$. The inverse dynamics algorithm also forms a part of forward dynamics algorithms such as those based upon composite body inertias or the conjugate gradient method ([12]).

Collecting together the recursive equations in Eq. (11), Eq. (24), Eq. (36) and Eq. (41) we obtain the following recursive Newton-Euler inverse dynamics algorithm:

$$\begin{cases} V_m(N+1) = 0, \alpha_m(N+1) = 0 \\ \text{for } k = N \ldots 1 \\ \quad V_m(k) = \Phi^*(k+1,k)V_m(k+1) + \mathcal{H}^*(k)\chi(k) \\ \quad \alpha_m(k) = \Phi^*(k+1,k)\alpha_m(k+1) + \mathcal{H}^*(k)\dot{\chi}(k) + a_m(k) \\ \text{end loop} \end{cases} \quad (44)$$

$$\begin{cases} f_m(0) = 0 \\ \text{for } k = 1 \ldots N \\ \quad f_m(k) = \Phi(k,k-1)f_m(k-1) + M_m(k)\alpha_m(k) + b_m(k) + K_m(k)\theta(k) \\ \quad T(k) = \mathcal{H}(k)f_m(k) \\ \text{end loop} \end{cases}$$

The structure of this algorithm closely resembles the recursive Newton-Euler inverse dynamics algorithm for rigid multibody systems (see [13, 1]). All external forces on the $k^{th}$ body are handled by absorbing them into the gyroscopic force term $b_m(k)$. Base mobility is handled by attaching an additional 6 degrees of freedom hinge between the mobile base and an inertial frame.

By taking advantage of the special structure of $\Phi(k+1,k)$ and $\mathcal{H}(k)$ in Eq. (12) and Eq. (13), the Newton-Euler recursions in Eq. (44) can be further simplified. Using block partitioning and the superscripts f and r as before to denote the flexible and rigid components or versions of the various quantities, we have that $$V_m(k) = \begin{pmatrix} V_m^f(k) \\ V_m^r(k) \end{pmatrix}, \alpha_m(k) = \begin{pmatrix} \alpha_m^f(k) \\ \alpha_m^r(k) \end{pmatrix},$$

$$f_m(k) = \begin{pmatrix} f_m^f(k) \\ f_m^r(k) \end{pmatrix}, \text{ and } T(k) = \begin{pmatrix} T^f(k) \\ T^r(k) \end{pmatrix}$$

It is easy to verify that Eq. (45) below is a simplified version of the inverse dynamics algorithm in Eq. (44).

the generalized forces vector T(k) corresponding to the hinge actuator forces $T^r(k)$ can be set, while the remaining generalized forces $T^f(k)$ are zero. Thus in contrast with rigid multibody systems, flexible multibody systems are under-actuated systems ([14]), since the number of available actuators is less than the number of motion degrees of freedom in the system. For such under-actuated systems, the inverse dynamics computations for the generalized force T are meaningful only when the prescribed generalized accelerations $\ddot{X}$ form a consistent data set. For a consistent set of generalized accelerations, the inverse dynamics computations will lead to a generalized force vector T such that $T^f(.) = 0$.

5. Composite Body Forward Dynamics Algorithm

The forward dynamics problem for a multibody system requires computing the generalized accelerations $\dot{X}$ for a given vector of generalized forces T and state of the system $\{v, X\}$. The composite body forward dynamics algorithm described below consists of the followings steps: (a) computing the system mass matrix $\mathcal{M}$, (b) computing the bias vector $\mathcal{C}$, and (c) numerically solving the following linear matrix equation for $\ddot{X}$:

$$\begin{cases} V_m(N+1) = 0, \alpha_m(N+1) = 0 \\ \text{for } k = N \ldots 1 \\ \quad V_m^f(k) = \dot{\eta}(k) \\ \quad V_m^r(k) = \phi^*(t_{k+1},k)\mathcal{A}^*(k+1)V_m(k+1) + H\bar{t}^*(k)\beta(k) - {}^d(k)\dot{\eta}(k) \\ \quad \alpha_m^f(k) = \ddot{\eta}(k) \\ \quad \alpha_m^r(k) = \phi^*(t_{k+1},k)\mathcal{A}^*(k+1)\alpha_m(k+1) + H\bar{t}^*(k)\dot{\beta}(k) - \Pi^d(k)\ddot{\eta}(k) + a_m^r(k) \\ \text{end loop} \end{cases} \quad (45)$$

$$\begin{cases} f_m(0) = 0 \\ \text{for } k = 1 \ldots N \\ \quad f_m(k) = \mathcal{A}(k)\phi(t_k,k-1)f_m^r(k-1) + M_m(k)\alpha_m(k) + b_m(k) + K_m(k)\theta(k) \\ \quad T(k) = \begin{pmatrix} T^f(k) \\ T^r(k) \end{pmatrix} = \begin{pmatrix} f_m^f(k) - [\Pi^d(k)]^*f_m^r(k) \\ H\bar{t}(k)f_m^r(k) \end{pmatrix} \\ \text{end loop} \end{cases}$$

In the foregoing algorithm, $\dot{\eta}(k)$ and $\ddot{\eta}(k)$ are the modal deformation velocities and accelerations, respectively, computed from the results obtained for a previous time step by a forward dynamics algorithm of the type described below herein. Flexible multibody systems have actuators typically only at the hinges. Thus for the $k^{th}$ body, only the subset of $$\mathcal{M}\ddot{X} = T - \mathcal{C} \quad (46)$$

Later in Section 6 we describe the recursive articulated body forward dynamics algorithm that does not require the explicit computation of either $\mathcal{M}$ or $\mathcal{C}$.

It is evident from Eq. (46) that the components of the vector C are the generalized forces for the system when the generalized accelerations $\dot{X}$ are all zero. Thus C can be computed using the inverse dynamics algorithm in Eq. (45). We describe next an efficient composite-body-based recursive algorithm for the computation of the mass matrix $\mathcal{M}$. This algorithm is based upon the following lemma which contains a decomposition of the mass matrix into block diagonal, block upper triangular and block lower triangular components.

Lemma 5.1

Define the composite body inertias $R(k) \in \mathfrak{R}^{\overline{N}(k) \times \overline{N}(k)}$ recursively for all the bodies in the serial chain as follows:

$$\begin{cases} R(0) = 0 \\ \text{for } k = 1 \ldots N \\ \quad R(k) = \Phi(k,k-1)R(k-1)\Phi^*(k,k-1) + M_m(k) \\ \text{end loop} \end{cases} \quad (47)$$

Also define $R \triangleq \text{diag}\{R(k)\} \in \mathfrak{R}^{\overline{N} \times \overline{N}}$. Then we have the following spatial operator decomposition $$\Phi M_m \Phi^* = R + \widetilde{\Phi} R + R \widetilde{\Phi}^* \quad (48)$$

where $\Phi \triangleq \widetilde{\Phi} - I$:

Proof: See Appendix A.

Physically, $R(k)$ is the modal mass matrix of the composite body formed from all the bodies outboard of the $k^{th}$ hinge by freezing all their (deformation plus hinge) degrees of freedom. It follows from Eq. (43) and Lemma 5.1 that $$\mathcal{M} = \mathcal{H} \Phi M_m \Phi^* \mathcal{H}^* = \mathcal{H} R \mathcal{H}^* + \mathcal{H} R \widetilde{\Phi} R \mathcal{H}^* + \mathcal{H} R \widetilde{\Phi}^* \mathcal{H}^* \quad (49)$$

Note that the three terms on the right of Eq. (49) are block diagonal, block lower triangular and block upper triangular respectively. The following algorithm for computing the mass matrix $\mathcal{M}$ computes the elements of these terms recursively.

element is computed, a new recursion to compute the off-diagonal elements is spawned. The structure of this algorithm closely resembles the composite rigid body algorithm for computing the mass matrix of rigid multibody systems ([12, 8]). Like the latter, it is also highly efficient. Additional computational simplifications of the algorithm arising from the sparsity of both $\mathcal{H}_f(k)$ and $\mathcal{H}_r(k)$ are easy to incorporate.

6. Factorization and Inversion of the Mass Matrix

An operator factorization of the system mass matrix $\mathcal{M}$, denoted the Innovations Operator Factorization, is derived in this section. This factorization is an alternative to the Newton-Euler factorization in Eq. (43) and, in contrast with the latter, the factors in the Innovations factorizations are square and invertible. Operator expressions for the inverse of these factors are developed and these immediately lead to an operator expression for the inverse of the mass matrix. The operator factorization and inversion results here closely resemble the corresponding results for rigid multibody systems (see [1]).

Figure 2:
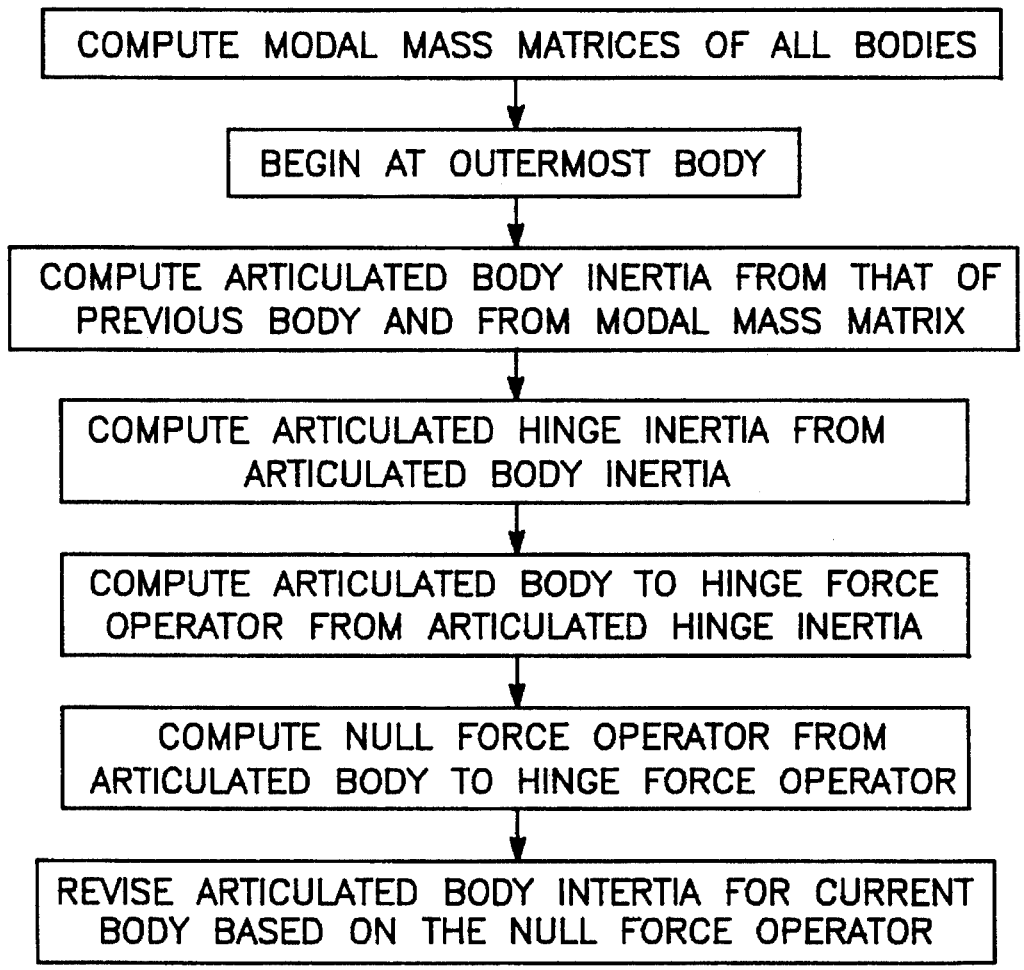
FIG. 2 is a block diagram illustrating how the articulated body quantities are produced in one embodiment of the invention.

Given below is a recursive algorithm illustrated in FIG. 2 which defines some required articulated body quantities. In the following algorithm, $P(k)$ is the articulated body inertia of body k, $D(k)$ is the articulated hinge inertia of hinge k, $G(k)$ is a body to hinge force operator of body and hinge k, and $\overline{\tau}(k)$ is a null force operator for hinge k which accounts for the component of applied force resulting in no hinge acceleration.

$$\begin{cases} R(0) = 0 \\ \text{for } k = 1 \ldots N \\ \quad R(k) \quad = \quad \Phi(k,k-1)R(k-1)\Phi^*(k,k-1) + M_m(k) \\ \qquad\quad = \quad \mathcal{A}_{(k)}\phi(t_k,k-1)R^{rr}(k-1)\phi^*(t_k,k-1)\mathcal{A}_{*(k)} + M_m(k) \\ \quad X(k) \quad = \quad R(k)\mathcal{H}_{*(k)} \\ \quad \mathcal{M}_s(k,k) \quad = \quad \mathcal{H}_{(k)}X(k) \\ \quad \begin{cases} \text{for } j = (k+1) \ldots N \\ \quad X(j) \quad = \quad \Phi(j,j-1)X(j-1) = \mathcal{A}_{(j)}\phi(t_j,j-1)X^r(j-1) \\ \quad \mathcal{M}_{(j,k)} \quad = \quad \mathcal{M}_{*(k,h)} = \mathcal{H}_{(j)}X(j) \\ \quad \text{end loop} \end{cases} \\ \text{end loop} \end{cases} \quad (50)$$

The main recursive proceeds from tip to base, and computes the blocks along the diagonal of $\mathcal{M}$. As each such diagonal $$\begin{cases} P^+(0) = 0 \\ \text{for } k = 1 \ldots N \\ \quad P(k) = \Phi(k,k-1)P^+(k-1)\Phi^*(k,k-1) + M_m(k) \in \Re^{\overline{\mathcal{N}}(k) \times \overline{\mathcal{N}}(k)} \\ \quad D(k) = \mathcal{H}(k)P(k)\mathcal{H}_*(k) \in \Re^{\mathcal{N}(k) \times \mathcal{N}(k)} \\ \quad G(k) = P(k)\mathcal{H}_*(k)D^{-1}(k) \in \Re^{\overline{\mathcal{N}}(k) \times \mathcal{N}(k)} \\ \quad K(k+1,k) = \Phi(k+1,k)G(k) \in \Re^{\overline{\mathcal{N}}(k) \times \mathcal{N}(k)} \\ \quad \overline{\tau}(k) = I - G(k)\mathcal{H}(k) \in \Re^{\overline{\mathcal{N}}(k) \times \overline{\mathcal{N}}(k)} \\ \quad P^+(k) = \overline{\tau}(k)P(k) \in \Re^{\overline{\mathcal{N}}(k) \times \overline{\mathcal{N}}(k)} \\ \quad \psi(k+1,k) = \Phi(k+1,k)\tau(k) \in \Re^{\overline{\mathcal{N}}(k) \times \overline{\mathcal{N}}(k)} \\ \text{end loop} \end{cases}$$

The operator $P \in \Re^{\overline{\mathcal{N}} \times \overline{\mathcal{N}}}$ is defined as a block diagonal matrix with the $k^{th}$ diagonal element being $P(k)$. The quantities defined in Eq. (51) form the component elements of the following spatial operators:

$$D \triangleq \mathcal{H}P\mathcal{H}^* = \text{diag}\{D(k)\} \in \Re^{\mathcal{N} \times \mathcal{N}}$$
$$G \triangleq P\mathcal{H}^*D^{-1} = \text{diag}\{G(k)\} \in \Re^{\overline{\mathcal{N}} \times \mathcal{N}}$$
$$K \triangleq \mathcal{E}_\Phi G \in \Re^{\overline{\mathcal{N}} \times \mathcal{N}}$$
$$\overline{\tau} \triangleq I - G\mathcal{H} = \text{diag}\{\overline{\tau}(k)\} \in \Re^{\overline{\mathcal{N}} \times \overline{\mathcal{N}}}$$
$$\mathcal{E}_\psi \triangleq \mathcal{E}_\Phi \overline{\tau} \in \Re^{\overline{\mathcal{N}} \times \overline{\mathcal{N}}} \quad (52)$$

The only nonzero block elements of $K$ and $\mathcal{E}_\psi$ are the elements' $K(k+1,k)$'s and $\psi(k+1,k)$'s respectively along the first sub-diagonal.

As in the case for $\mathcal{E}_\Phi$, $\mathcal{E}_\psi$ is nilpotent, so we can define the operator $\psi$ as follows.

$$\psi \triangleq (I - \mathcal{E}_\psi)^{-1} = \begin{pmatrix} I & 0 & \cdots & 0 \\ \psi(2,1) & I & \cdots & 0 \\ \vdots & & & \vdots \\ \psi(N,1) & \psi(N,2) & \cdots & I \end{pmatrix} \in \Re^{\overline{\mathcal{N}} \times \overline{\mathcal{N}}} \quad (53)$$

where
$$\psi(i,j) \triangleq \psi(i,i-1) \ldots \psi(j+1,j) \text{ for } I|i > j$$

The structure of the operators $\mathcal{E}_\psi$ and $\psi$ is identical to that of the operators $\mathcal{E}_\Phi$ and $\Phi$ respectively except that the component elements are now $\psi(i,j)$ rather than $\Phi(i,j)$. Also, the elements of $\psi$ have the same semigroup properties as the elements of the operator $\Phi$, and as a consequence, high-level operator expressions involving them can be directly mapped into recursive algorithms, and the explicit computation of the elements of the operator $\psi$ is not required.

The Innovations Operator Factorization of the mass matrix is defined in the following lemma.

Lemma 6.1

$$\mathcal{M} = [I + \mathcal{H}\Phi K]D[I + \mathcal{H}\Phi K]^* \quad (54)$$

Proof: See Appendix A.

Note that the factor $[I + \mathcal{H}\Phi K] \in \Re^{\mathcal{N} \times \mathcal{N}}$ is square, block lower triangular and nonsingular, while $D$ is a block diagonal matrix. This factorization provides a closed-form expression for the block LDL* decomposition of $\mathcal{M}$. The following lemma gives the closed form operator expression for the inverse of the factor $[I + \mathcal{H}\Phi K]$.

Lemma 6.2

$$[I + \mathcal{H}\Phi K]^{-1} = [I - \mathcal{H}\psi K] \quad (55)$$

Proof: See Appendix A.

It follows from Lemma 6.1 and 6.2 that the operator expression for the inverse of the mass matrix is given by:

Lemma 6.3

$$\mathcal{M}^{-1} = [I - \mathcal{H}\psi K]^* D^{-1}[I - \mathcal{H}\psi K] \quad (56)$$

Once again, note that the factor $[I - \mathcal{H}\psi K]$ is square, block lower triangular and nonsingular and so Lemma 6.3 provides a closed-form expression for the block LDL* decomposition of $\mathcal{M}^{-1}$.

7. Articulated Body Forward Dynamics Algorithm

We first use the operator expression for the mass matrix inverse developed in Section 6 to obtain an operator expression for the generalized accelerations $\dot{X}$. This expression directly leads to a recursive algorithm for the forward dynamics of the systems. The structure of this algorithm is completely identical in form to the articulated body algorithm for serial rigid multibody systems. The computational cost of this algorithm is further reduced by separately processing the flexible and hinge degrees of freedom at each step in the recursion, and this leads to the articulated body forward dynamics algorithm for serial flexible multibody systems. This algorithm is an alternative to the composite-body forward dynamics algorithm developed earlier.

The following lemma describes the operator expression for the generalized accelerations $\dot{X}$ in terms of the generalized forces T.

Lemma 7.1

$$\dot{X} = [I - \mathcal{H}\psi K]^* D^{-1}[T - \mathcal{H}\psi\{KT + Pa_m + b_m + K_m v\}] - K^*\psi^* a_m \quad (57)$$

Proof:

See Appendix A.

Figure 3:
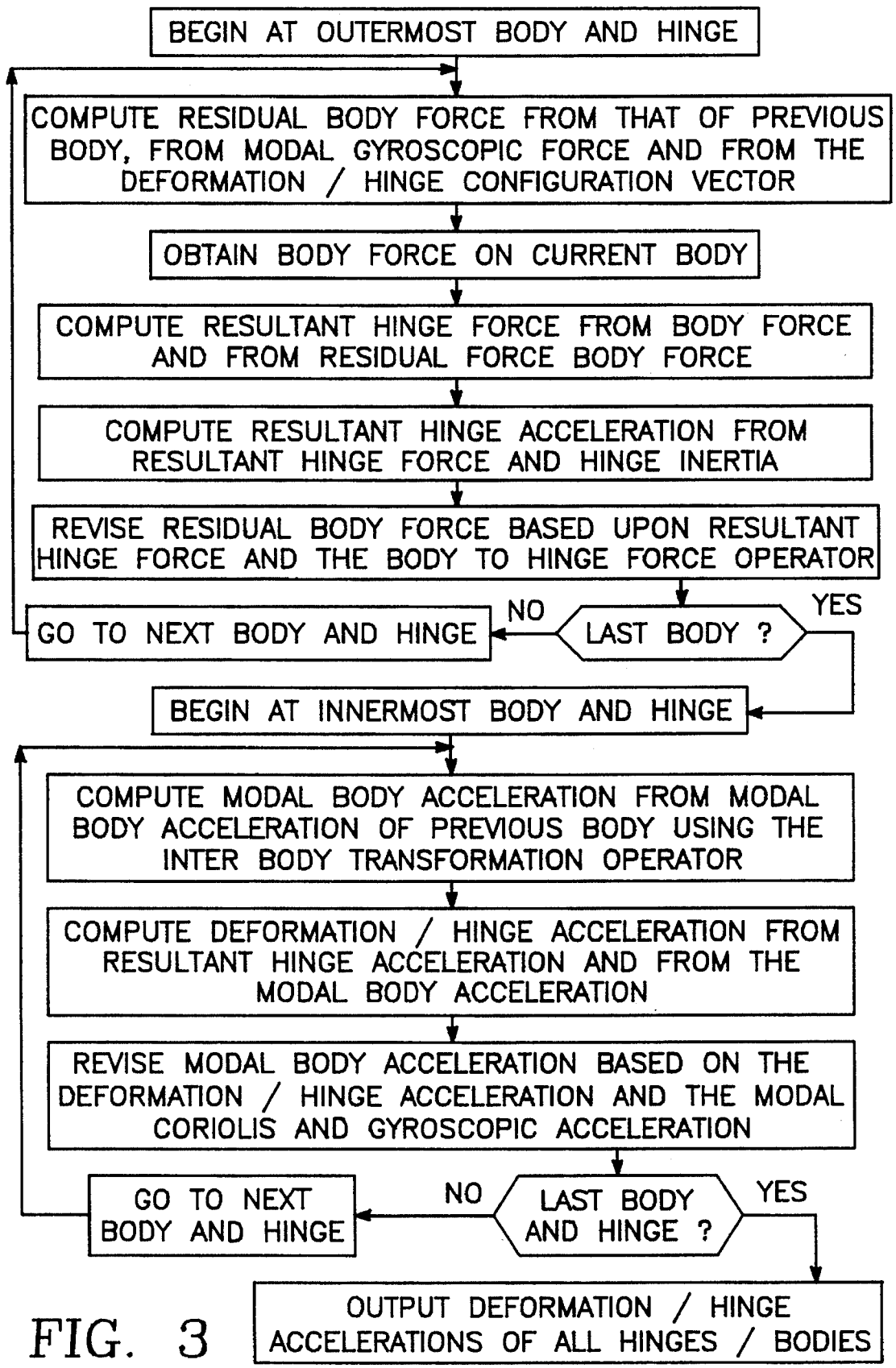
FIG. 3 is a block diagram illustrating an articulated body forward dynamics algorithm for flexible link manipulators in accordance with the present invention.

As in the case of rigid multibody systems ([1, 2]), the direct recursive implementation of Eq. (57) leads to the following recursive forward dynamics algorithm illustrated in FIG. 3. In the following algorithm, $z(k)$ is a residual body force on body $k$, $\epsilon(k)$ is the resultant hinge force on hinge $k$, $v(k)$ is the resultant hinge acceleration of hinge $k$ and $z^+(k)$ is the revised residual body force on body $k$:

$$\begin{cases} z^+(0) = 0 \\ \text{for } k = 1 \ldots n \\ \quad z(k) = \Phi(k,k-1)z^+(k-1) + P(k)a_m(k) + \\ \qquad\qquad b_m(k) + K_m(k)\theta(k) \\ \quad \epsilon(k) = T(k) - \mathcal{H}(k)z(k) \\ \quad v(k) = D^{-1}(k)\epsilon(k) \\ \quad z^+(k) = z(k) + G(k)\epsilon(k) \\ \text{end loop} \end{cases} \tag{58}$$

$$\begin{cases} \alpha_m(n+1) = 0 \\ \text{for } k = n \ldots 1 \\ \quad \alpha_m^+(k) = \Phi^*(k+1,k)\alpha_m(k+1) \\ \quad \dot{\chi}(k) = v(k) - G^*(k)\alpha_m^+(k) \\ \quad \alpha_m(k) = \alpha_m^+(k) + \mathcal{H}^*(k)\dot{\chi}(k) + \alpha_m(k) \\ \text{end loop} \end{cases}$$

The structure of this algorithm is closely related to the structure of the well known Kalman filtering and smoothing algorithms ([8]). All the degrees of freedom for each body (as characterized by its joint map matrix $\mathcal{H}^*(.)$) are processed together at each recursion step in this algorithm. However, by taking advantage of the sparsity and special structure of the joint map matrix, additional reduction in computational cost is obtained by processing the flexible degrees of freedom and the hinge degrees of freedom separately. These simplifications are described in the following sections.

7.1 Simplified Algorithm for the Articulated Body Quantities

Instead of a detailed derivation, we describe here the conceptual basis for the separation of the modal and hinge degrees of freedom for each body. First we recall the velocity recursion equation in Eq. (11)

$$V_m(k) = \Phi^*(k+1,k)V_m(k+1) + \mathcal{H}^*(k)X(k) \tag{59}$$

and the partitioned form of $\mathcal{H}(k)$ in Eq. (13)

$$\mathcal{H}(k) = \begin{pmatrix} \mathcal{H}_f(k) \\ \mathcal{H}_r(k) \end{pmatrix} \tag{60}$$

Introducing a dummy variable k', we can rewrite Eq. (59) as $$V_m(k') = \Phi^*(k+1,k')V_m(k+1) + \mathcal{H}^*_f(k)\eta(k)$$
$$V_m(k) = \Phi^*(k',k)V_m(k') + \mathcal{H}^*_r(k)\beta(k) \tag{61}$$

where $$\Phi(k+1,k') \triangleq \Phi(k+1,k) \text{ and } \Phi(k',k) \triangleq I$$

Conceptually, each flexible body is now associated with two new bodies. The first one has the same kinematical and mass/inertia properties as the real body and is associated with the flexible degrees of freedom. The second body is a fictitious body and is massless and has zero extent. It is associated with the hinge degrees of freedom. The serial chain now contains twice the number of bodies as the original one, with half the new bodies being fictitious ones. The new $\mathcal{H}^*$ operator now has the same number of columns but twice the number of rows as the original $\mathcal{H}^*$ operator. The new $\Phi$ operator has twice as many rows and columns as the original one. Repeating the analysis described in the previous sections, we once again obtain the same operator expression as Eq. (57). This expression also leads to a recursive forward dynamics algorithm as in Eq. (58). However each sweep in the algorithm now contains twice as many steps as the original algorithm. But since each step now processes only a smaller number of degrees of freedom, this leads to a reduction in the overall cost. In the following algorithm, the subscript r denotes the rigid component or version of the subscripted quantity while the subscript f denotes the flexible component or version of the subscripted quantity. Thus, $\mathcal{H}_f(k)$ is a matrix including the corresponding modal spatial influence vector, while $\mathcal{H}_r(k)$ is a matrix including the corresponding transformed joint map matrix. The new algorithm (replacing Eq. (51)) for computing the articulated body quantities is as follows:

$$\begin{cases} P^+(0) = 0 \\ \text{for } k = 1 \ldots N \\ \quad \Gamma(k) = \mathcal{B}(k,k-1)P^+(k-1)\mathcal{B}^*(k,k-1) \in \mathfrak{R}^{6\times 6} \\ \quad P(k) = \mathcal{A}(k)\Gamma(k)\mathcal{A}^*(k) + M_m(k) \in \mathfrak{R}^{\mathcal{N}(k)\times \mathcal{N}(k)} \\ \quad D_f(k) = \mathcal{H}_f(k)P(k)\mathcal{H}_f^*(k) \in \mathfrak{R}^{n_m(k)\times n_m(k)} \\ \quad G_f(k) = P(k)\mathcal{H}_f^*(k)D_f^{-1}(k) \in \mathfrak{R}^{\mathcal{N}(k)\times n_m(k)} \\ \quad \bar{\tau}_f(k) = I - G_f(k)\mathcal{H}_f(k) \in \mathfrak{R}^{\mathcal{N}(k)\times \mathcal{N}(k)} \\ \quad P_r(k) = \bar{\tau}_f(k)P(k) \in \mathfrak{R}^{\mathcal{N}(k)\times \mathcal{N}(k)} \\ \quad D_r(k) = \mathcal{H}_r(k)P_r(k)\mathcal{H}_r^*(k) \in \mathfrak{R}^{n_r(k)\times n_r(k)} \\ \quad G_r(k) = P_r(k)\mathcal{H}_r^*(k)D_r^{-1}(k) \in \mathfrak{R}^{\mathcal{N}(k)\times n_r(k)} \\ \quad \bar{\tau}_r(k) = I - G_r(k)\mathcal{H}_r(k) \in \mathfrak{R}^{\mathcal{N}(k)\times \mathcal{N}(k)} \\ \quad P^+(k) = \bar{\tau}_r(k)P_r(k) \in \mathfrak{R}^{\mathcal{N}(k)\times \mathcal{N}(k)} \\ \Psi(k+1,k) = \Phi(k+1,k)\bar{\tau}(k) \in \mathfrak{R}^{\mathcal{N}(k)\times \mathcal{N}(k)} \\ \text{end loop} \end{cases} \tag{62}$$

We now use the sparsity of $\mathcal{B}(k+1,k)$, $\mathcal{H}_f(k)$ and $\mathcal{H}_r(k)$ to further simplify the above algorithm. Using the symbol "x" to indicate "don't care" blocks, the structure in block partitioned form of some of the quantities in Eq. (62) is given below. In the following algorithm, the subscripts f and r have the same significance as that discussed previously herein, the subscript R denotes another rigid version of the subscripted quantity (defined below), while $P^{rf}(k)$ and $P^{rr}(k)$ denote the blocks of the articulated body inertia P(k) partitioned in the same manner as that discussed previously herein with reference to the partitioning of the modal mass matrix in Equation (23):

$$\Gamma(k) = \phi(t_k, k-1)P_R^+(k-1)\phi^*(t_k, k-1),$$

($P_R^+(k)$ is defined below)

$$G_f(k) = \begin{pmatrix} x \\ g(k) \end{pmatrix}, \text{ where } g(k) = \mu(k)D_f^{-1}(k) \in \mathfrak{R}^{6\times n_m(k)},$$

and $\mu(k) \triangleq [P^{rf}(k), P^{rr}(k)]\mathcal{H}_f^*(k) \in \mathfrak{R}^{6\times n_m(k)}$ $$P_r(k) = \begin{pmatrix} x & x \\ x & P_R(k) \end{pmatrix}, \text{ where } P_R(k) = P^{rr}(k) - g(k)\mu^*(k) \in \mathfrak{R}^{6\times 6}$$

$$D_r(k) = H\mathcal{F}(k)P_R(k)H\mathcal{F}^*(k) \in \mathfrak{R}^{n_r(k)\times n_r(k)}$$

$$G_r(k) = \begin{pmatrix} x \\ G_R(k) \end{pmatrix}, \text{ where } G_R(k) \triangleq P_R(k)H\bar{\tau}^*(k)D_r^{-1}(k) \in \mathfrak{R}^{6\times n_r(k)}$$

$$\bar{\tau}_r(k) = \begin{pmatrix} I & x \\ 0 & \bar{\tau}_R(k) \end{pmatrix}, \text{ where } \bar{\tau}_R(k) = I - G_R(k)H\bar{\tau}(k) \in \mathfrak{R}^{6\times 6}$$

$$P^+(k) = \begin{pmatrix} x & x \\ x & P_R^+(k) \end{pmatrix}, \text{ where } P_R^+(k) = \bar{\tau}_R(k)P_R(k) \in \Re^{6\times 6}$$

Using the structure described above the simplified algorithm for computing the articulated body quantities is as follows:

$$\begin{cases} P_R^+(0) = 0 \\ \text{for } k = 1 \ldots N \\ \quad \Gamma(k) = \phi(t_k, k-1)P_R^+(k-1)\phi^*(t_k, k-1) \\ \quad P(k) = \mathcal{A}_{(k)}\Gamma(k)\mathcal{A}_{*(k)} + M_m(k) \\ \quad D_f(k) = \mathcal{H}_f(k)P(k)\mathcal{H}_f^*(k) \\ \quad \mu(k) = [P^{rf}(k), P^{rr}(k)]\,\mathcal{H}_f^*(k) \\ \quad g(k) = \mu(k)D_f^{-1}(k) \\ \quad P_R(k) = P^{rr}(k) - g(k)\mu^*(k) \\ \quad D_R(k) = H\bar{\tau}(k)P_R(k)H\bar{\tau}^*(k) \\ \quad G_R(k) = P_R(k)H\bar{\tau}^*(k)D_R^{-1}(k) \\ \quad \bar{\tau}_R(k) = I - G_R(k)H\bar{\tau}(k) \\ \quad P_R^+(k) = \bar{\tau}_R(k)P_R(k) \\ \text{end loop} \end{cases} \quad (63)$$

7.2 Simplified Articulated Body Forward Dynamics Algorithm

Figure 4:
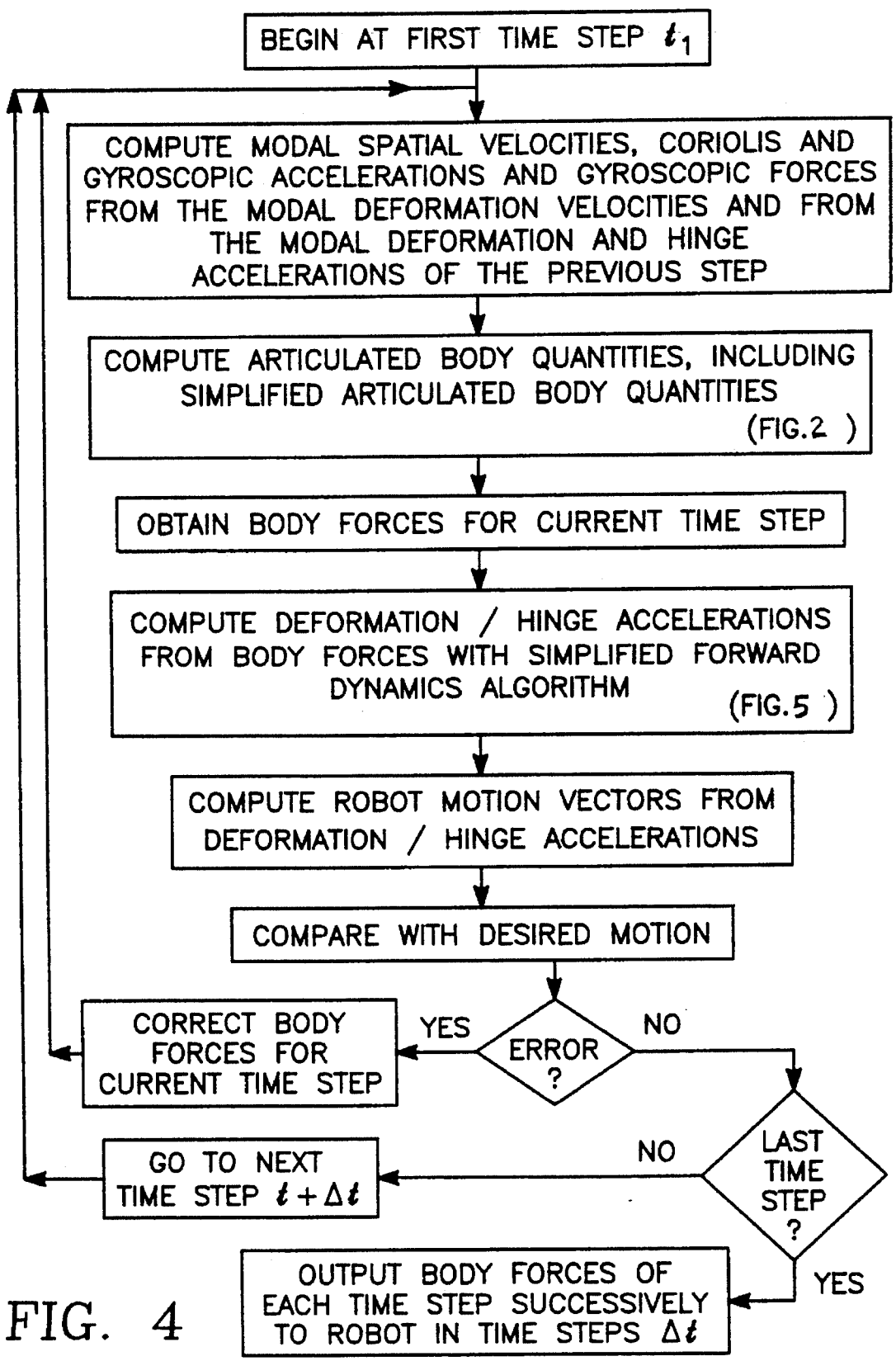
FIG. 4 is a block diagram illustrating the process of the invention for controlling a robot manipulator having flexible links.
Figure 5A:
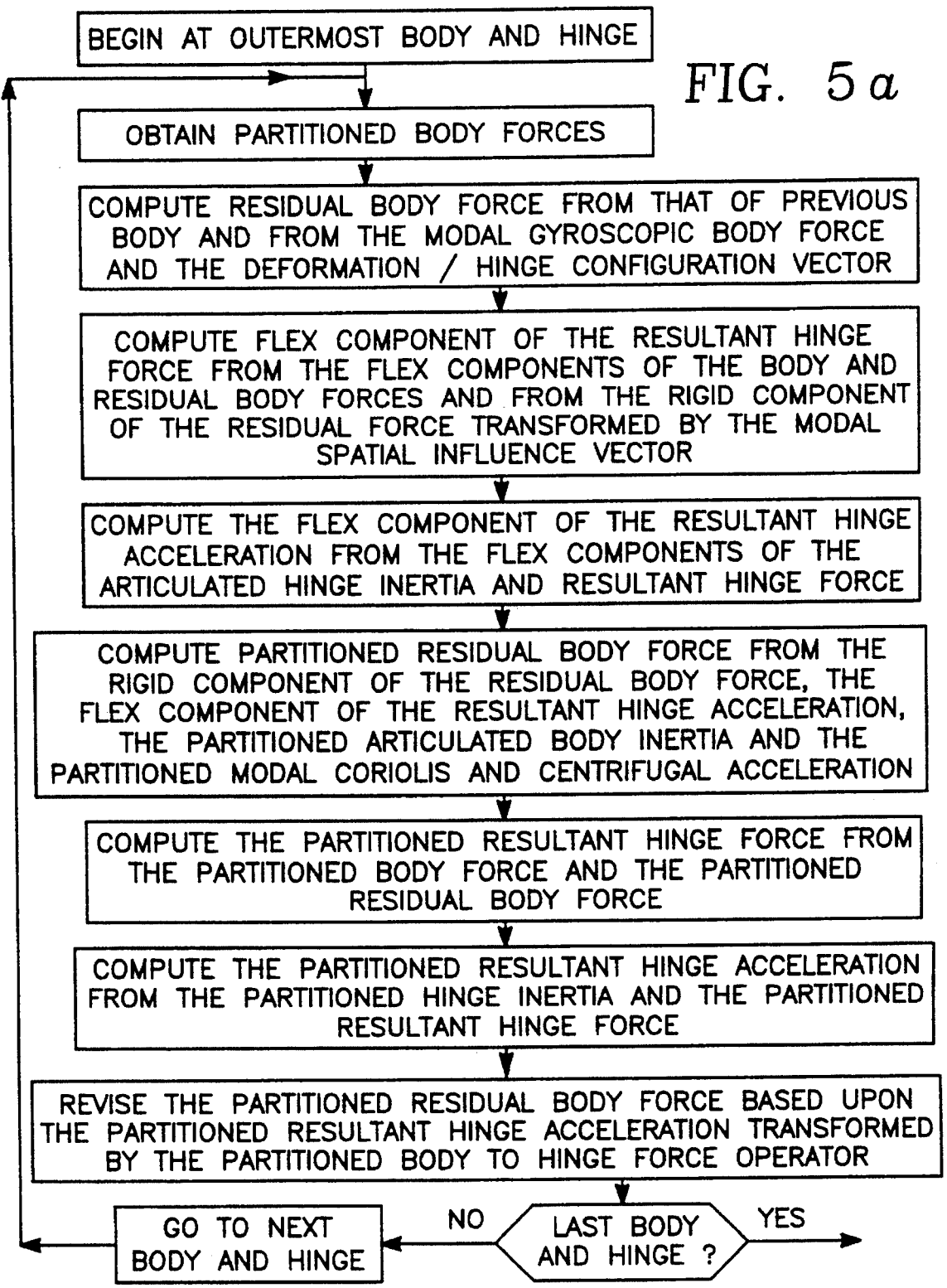
FIGS. 5a and 5b constitute a block diagram illustrating a preferred embodiment of the articulate body forward dynamics algorithm employed in the process of FIG. 4.
Figure 5B:
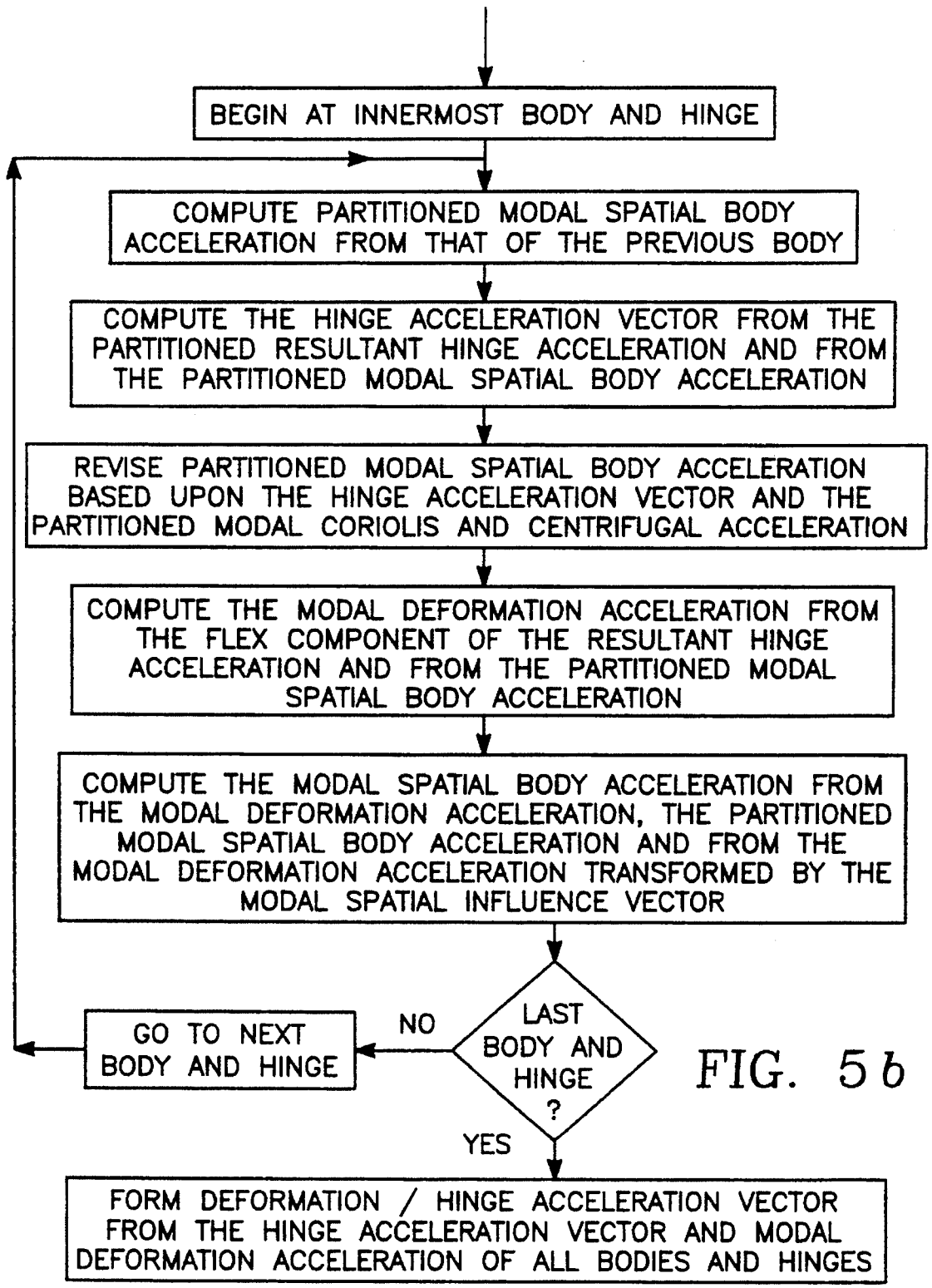

The complete recursive articulated body forward dynamics algorithm for a serial flexible multibody system follows directly from the recursive implementation of the expression in Eq. (57). The algorithm consists of the following steps as illustrated in FIG. 4: (a) a base-to-tip recursion as in Eq. (45) for computing the modal spatial velocities $V_m(k)$ and the Coriolis and gyroscopic terms $a_m(k)$ and $b_m(k)$ for all the bodies; (b) computation of the articulated body quantities using Eq. (78) and Eq. (63); and (c) a tip-to-base recursion followed by a base-to-tip recursion for the joint accelerations $\ddot{X}$ as described below and illustrated in FIGS. 5a and 5b:

$$\begin{cases} z_R^+(0) = 0 \\ \text{for } k = 1 \ldots N \\ \quad z(k) = \begin{pmatrix} z_f(k) \\ z_r(k) \end{pmatrix} \\ \quad \quad = \mathcal{A}_{(k)}\phi(t_k, k-1)z_R^+(k-1) + b_m(k) + K_m(k)\theta(k) \in \Re^{\mathcal{N}(k)} \\ \quad \epsilon_f(k) = T_f(k) - z_f(k) + [\Pi^d(k)]^*z_r(k) \in \Re^{n_m(k)} \\ \quad v_f(k) = D_f^{-1}(k)\epsilon_f(k) \in \Re^{n_m(k)} \\ \quad z_R(k) = z_r(k) + g(k)\epsilon_f(k) + P_R(k)\alpha_{mR}(k) \in \Re^6 \\ \quad \epsilon_R(k) = T_r(k) - H\bar{\tau}(k)z_R(k) \in \Re^{n_r(k)} \\ \quad v_R(k) = D_R^{-1}(k)\epsilon_R(k) \in \Re^{n_r(k)} \\ \quad z_R^+(k) = z_R(k) + G_R(k)\epsilon_R(k) \in \Re^6 \\ \text{end loop} \end{cases} \quad (64)$$

$$\begin{cases} \alpha_m(N+1) = 0 \\ \text{for } k = N \ldots 1 \\ \quad \alpha_R^+(k) = \phi^*(t_{k+1}, k)\mathcal{A}_{*(k+1)}\alpha_m(k+1) \in \Re^6 \\ \quad \dot{\beta}(k) = v_R(k) - G_R^*(k)\alpha_R^+(k) \in \Re^{n_r(k)} \\ \quad \alpha_R(k) = \alpha_R^+(k) + H\bar{\tau}^*(k)\beta(k) + \alpha_{mR}(k) \in \Re^6 \\ \quad \ddot{\eta}(k) = v_f(k) - g^*(k)\alpha_R(k) \in \Re^{n_m(k)} \\ \quad \alpha_m(k) = \begin{pmatrix} \ddot{\eta}(k) \\ \alpha_R(k) - \Pi^d(k)\ddot{\eta}(k) \end{pmatrix} \in \Re^{\mathcal{N}(k)} \\ \text{end loop} \end{cases}$$

The recursion in Eq. (64) is obtained by simplifying the recursions in Eq. (58) in the same manner as described in the previous section for the articulated body quantities. The rigid Coriolis and centrifugal acceleration $a_{mR}(k)$ is given in Appendix C below herein.

In contrast with the composite body forward dynamics algorithm described in Section 5, the articulated body forward dynamics algorithm does not require the explicit computation of either $\mathcal{M}$ or $C$. The structure of this articulated body algorithm closely resembles the recursive articulated body forward dynamics algorithm for rigid multibody systems described in references ([15, 1]).

The articulated body forward dynamics algorithm has been used to develop a dynamics simulation software package (called DARTS) for the high-speed, real-time, hardware-in-the-loop simulation capability for planetary spacecraft. Validation of the DARTS software was carried out by comparing simulation results with those from a standard flexible multibody simulation package ([6]). The results from the two independent simulations have shown complete agreement.

A System Embodying the Invention

Figure 1B:
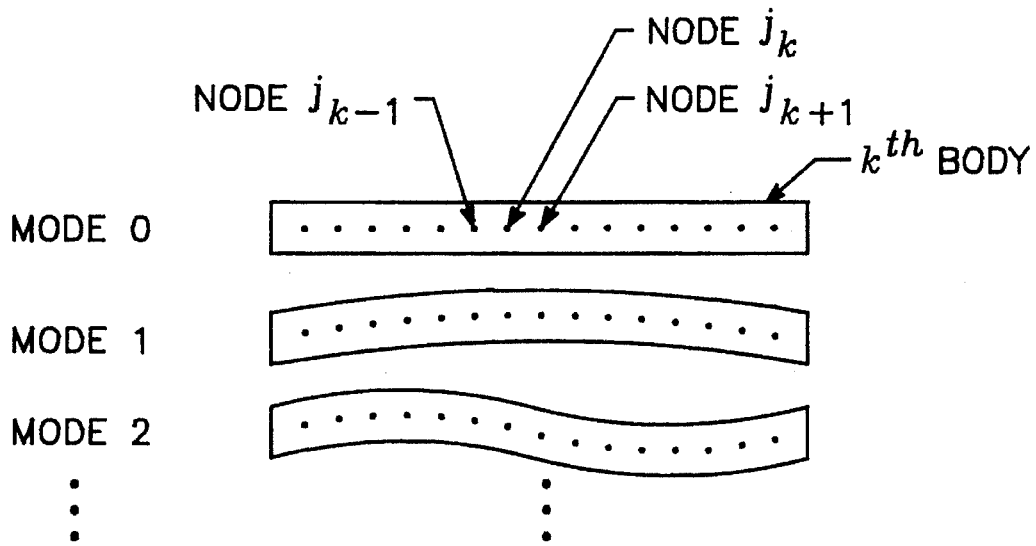
FIG. 1b is a simplified diagram illustrating the finite element analysis employed in the invention, in which the displacement of plural spaced nodes along the length of a flexible link follows a well-recognized pattern for each mode of flexibility.
Figure 6:
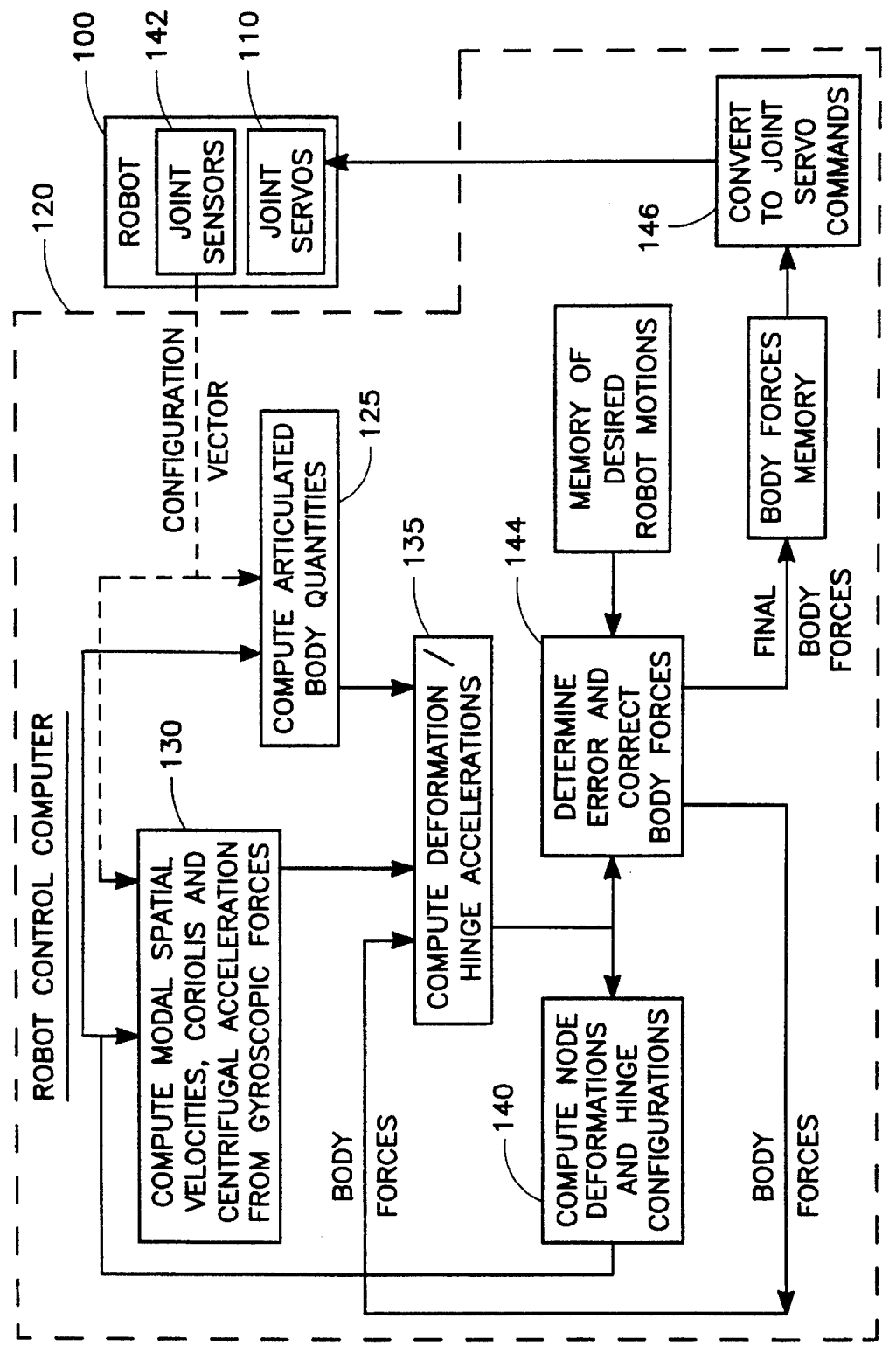
FIG. 6 is a simplified schematic block diagram of apparatus embodying the present invention.

Referring to FIG. 6, a robot manipulator 100 having flexible links (bodies), such as the manipulator illustrated in FIGS. 1a and 1b, includes joint servos 110 controlling respective articulating hinges of the manipulator. A robot control computer 120 includes a processor 125 which computes the articulated body quantities of the manipulator 100 from the current state of the manipulator 100 using the process of FIG. 2. The current state of the manipulator 100 is also used by a processor 130 to compute the Coriolis and centrifugal accelerations and gyroscopic forces of the manipulator links using the algorithm of Equation (44). A set of link (body) forces is specified to a processor 135. The processor 135 uses the specified body forces, the articulated body quantities computed by the processor 125 and the gyroscopic and Coriolis terms computed by the processor 130 to compute the deformation acceleration of the finite element nodes of each link (body) and the acceleration of each hinge by executing the algorithm of FIGS. 5a and 5b.

In one embodiment of the invention described above with reference to FIG. 4, the processor 135 repeats its operation over successive time steps, and the configuration vectors of the manipulator 100 required by the processors 125 and 130 are computed by a processor 140 from the accelerations computed by the processor 135 for the previous time step. In an alternative embodiment of the invention, the hinge configuration vectors are derived by the processors 125 and 130 directly from joint sensors 142 on the hinges of the manipulator 100.

As one example of the application of the results computed by the processor 135, a desired robot motion is defined by a set of user-specified node deformations and hinge accelerations for a succession of time steps. The node deformations and hinge accelerations computed during each time step by the processor 135 are compared by a processor 144 with a desired user-specified node deformations and hinge accelerations for the corresponding time step to determine an error and to correct the specified body forces to reduce the error using well-known feedback control techniques. Such feedback control techniques are well-understood in the art and need not be described here. The corrected body forces are then stored for later (or immediate) conversion by a processor 146 to joint servo commands for transmittal to the joint servos 110.

8. Computational Cost

This section discusses the computational cost of the composite body and the articulated body forward dynamics algorithms. For low-spin multibody systems, it has been suggested in [16] that using ruthlessly linearized models for each flexible body can lead to significant computational reduction without sacrificing fidelity. These linearized models are considerably less complex and do not require much of the modal integral data for the individual flexible bodies. All computational costs given below are based on the use of ruthlessly linearized models and the computationally simplified steps described in Appendix B.

Flexible multibody systems typically involve both rigid and flexible bodies and, in addition, different sets of modes are used to model the flexibility of each body. As a consequence, where possible, we described the contribution of a typical (non-extremal) flexible body, denoted the $k^{th}$ body, to the overall computational cost. Note that the computational cost for extremal bodies as well as for rigid bodies is lower than that for a non-extremal flexible body. Summing up this cost for all the bodies in the system gives a figure close to the true computational cost for the algorithm. Without any loss in generality, we have assumed here that all the hinges are single degree of freedom rotary joints and that free-free assumed modes are being used. The computational costs are given in the form of polynomial expressions for the number of floating point operations with the symbol M denoting multiplications and A denoting additions.

8.1 Computational Cost of the Composite Body Forward Dynamics Algorithm

The composite body forward dynamics algorithm described in Section 5 is based on solving the linear matrix equation.

$$\mathcal{M} \ddot{X} = T - C$$

The computational cost of this forward dynamics algorithm is given below:

1. Cost of computing $R(k)$ for the $k^{th}$ body using the algorithm in Eq. (50) is $[48n_m(k) + 90]M + [n_m^2(k) + 97/2 n_m(k) + 116]A.$ 2. Contribution of the $k^{th}$ body to the cost of computing $\mathcal{M}$ (excluding cost of $R(k)$'s) using the algorithm in Eq. (50) is $\{k[12n_m^2(k)+34n_m(k)+13]\}M+\{k[11n_m^2(k)+24n_m(k)+13]\}$ A.

3. Setting the generalized accelerations $\ddot{X}=0$, the vector $C$ can be obtained by using the inverse dynamics algorithm described in Eq. (45) for computing the generalized forces T. The contribution of the $k^{th}$ body to the computational cost for $C(k)$ is $\{2n_m^2(k)+54n_m(k)+206\}$ $M+\{2n_m^2(k)+50n_m(k)+143\}$ A.

4. The cost of computing $T-C$ is $\{\mathcal{N}\}$ A.

5. The cost of solving the linear equation in Eq. (46) for the accelerations $\ddot{X}$ is $\{1/6 \mathcal{N}^3 + 3/2 \mathcal{N}^2 - 2/3 \mathcal{N}\}M + \{1/6 \mathcal{N}^3 + \mathcal{N}^2 - 7/6 \mathcal{N}\}A.$ The overall complexity of the composite body forward dynamics algorithm is $O(\mathcal{N}^3)$.

8.2 Computational Cost of the Articulated Body Forward Dynamics Algorithm

The articulated body forward dynamics algorithm is based on the recursions described in Eq. (78), Eq. (63) and Eq. (64). Since the computations in Eq. (78) can be carried out prior to the dynamics simulation, the cost of this recursion is not included in the cost of the overall forward dynamics algorithm described below:

1. The algorithm for the computation of the articulated body quantities is given in Eq. (63). The step involving the computation of $D^{-1}(k)$ can be carried out either by an explicit inversion $D(k)$ with $O(n_m^3(k))$ cost, or by the indirect procedure described in Eq. (63) with $O(n_m^2(k))$ cost. The first method is more efficient than the second one for $n_m(k) \leq 7$.

Cost of Eq. (63) for the $k^{th}$ body based on the explicit inversion of $D(k)$ (used when $n_m(k) \leq 7$) is $$\{\tfrac{5}{6}n_m^3(k) + 25\tfrac{1}{2}n_m^2(k) + 76\tfrac{1}{3}n_m(k) + 180\}M +$$

$$\{\tfrac{5}{6}n_m^3(k) + 21\tfrac{1}{2}n_m^2(k) + 54\tfrac{8}{3}n_m(k) + 164\}$$

Cost of Eq. (63) for the $k^{th}$ body based on the indirect computation of $D^{-1}(k)$ (used when $n_m(k) \geq 8$) is $\{12n_m^2(k)+255n_m(k)+572\} M + \{13n_m^2(k)+182n_m(k)$ 2. The cost for the tip-to-base recursion sweep in Eq. (64) for the $k^{th}$ body is $\{n_m^2(k)+25n_m(k)+49\} M + \{n_m^2(k)+24n_m(k)+50\} A$.

3. The cost for the base-to-tip recursion sweep in Eq. (64) for the $k^{th}$ body is $\{18n_m(k)+52\{19n_m(k)+42\{ A$.

The overall complexity of this algorithm is $O(Nn_m^2)$, where $n_m$ is an upper bound on the number of modes per body in the system.

From a comparison of the computational costs, it is clear that the articulated body algorithm is more efficient than the composite body algorithm as the number modes and bodies in the multibody system increases. The articulated body algorithm is faster by over a factor of 3 for 5 modes per body, and by over a factor of 7 for the case of 10 modes per body. The divergence between the costs for the two algorithms becomes even more rapid as the number of bodies is increased.

9. Extensions to General Topology Flexible Multibody Systems

For rigid multibody systems, [11] describes the extensions to the dynamics formulation and algorithms that are required as the topology of the system goes from a serial chain topology, to a tree topology and finally to a closed-chain topology system. The key to this progression is the invariance of the operator description of the system dynamics to increases in the topological complexity of the system. Indeed, as seen here, the operator description of the dynamics remains the same even when the multibody system contains flexible rather than rigid component bodies. Thus, using the approach in [11] for rigid multibody systems, the dynamics formulation and algorithms for flexible multibody systems with serial topology can be extended in a straightforward manner to systems with tree or closed-chain topology. Based on these observations, extending the serial chain dynamics algorithms described in this specification to tree topology flexible multibody systems requires the follow steps:

1. For each outward sweep involving a base to tip(s) recursion, at each body, the outward recursion must be continued along each outgoing branch emanating from the current body.

2. For each inward sweep involving a tip(s) to base recursion, at each body, the recursion must be continued inwards only after summing up contributions from each of the other incoming branches for the body.

A closed-chain topology flexible multibody system can be regarded as a tree topology system with additional closure constraints. As described in [11], the dynamics algorithm for closed-chain systems consists of recursions involving the dynamics of the tree topology system, and in addition the computation of the closure constraint forces. The computation of the constraint forces requires the effective inertia of the tree topology system reflected to the points of closure.

The algorithm for closed-chain flexible multibody systems for computing these inertias is identical in form to the recursive algorithm described in [11].

10. Conclusions

This invention uses spatial operator methods to develop a new dynamics formulation for flexible multibody systems. A key feature of the formulation is that the operator description of the flexible system dynamics is identical in form to the corresponding operator description of the dynamics of rigid multibody systems. A significant advantage of this unifying approach is that it allows ideas and techniques for rigid multibody systems to be easily applied to flexible multibody systems. The Newton-Euler Operator Factorization of the mass matrix forms the basis for recursive algorithms such as those for the inverse dynamics, the computation of the mass matrix, and the composite body forward dynamics algorithm for the flexible multibody system. Subsequently, we develop the articulated body forward dynamics algorithm, which, in contrast to the composite body forward dynamics algorithm, does not require the explicit computations of the mass matrix. While the computational cost of the algorithms depends on factors such as the topology and the amount of flexibility in the multibody system, in general, the articulated body forward dynamics algorithm is by far the more efficient algorithm for flexible multibody systems containing even a small number of flexible bodies. All of the algorithms are closely related to those encountered in the domain of Kalman filtering and smoothing. While the major focus in this specification is on flexible multibody systems with serial chain topology, the extensions to tree and closed chain topologies are straightforward and are described as well.

While the invention has been described in detail by specific reference to preferred embodiments thereof, it is understood that variations and modifications may be made without departure from the true spirit of the invention.

Appendix A: Proofs of the Lemmas

At the operator level, the proofs of the lemmas in this publication are completely analogous to those for rigid multibody systems ([1, 2]).

Proof of Lemma 5.1: Using operators, we can rewrite Eq. (47) in the form $$M_m = R - \mathcal{E}_\Phi R \mathcal{E}^*_\Phi \qquad (65)$$

From Eq. (19) it follows that $\Phi \mathcal{E}_\Phi = \mathcal{E}_\Phi \Phi = \Phi - I = \tilde{\Phi}$. Multiplying Eq. (65) from the left and right by $\Phi$ and $\Phi^*$ respectively leads to $$\Phi M_m \Phi^* = \Phi R \Phi^* - \Phi \mathcal{E}_\Phi R \mathcal{E}^*_\Phi = (\Phi+I)R(\Phi+I)^* - \Phi R \tilde{\Phi}^* = R + \tilde{\Phi}R + R\tilde{\Phi}^*$$

Proof of Lemma 6.1: It is easy to verify that $\bar{\tau}\bar{P}\bar{\tau}^* = \bar{\tau}P$. As a consequence, the recursion for $P(.)$ in Eq. (51) can be rewritten in the form $$M_m = P - \mathcal{E}_\psi P \mathcal{E}^*_\psi = P - \mathcal{E}_\psi P \mathcal{E}^*_\Phi = P - \mathcal{E}_\Phi P \mathcal{E}^*_\Phi + KDK^* \qquad (66)$$

Pre- and post-multiplying the above by $\Phi$ and $\Phi^*$ respectively then leads to $$\Phi M_m \Phi^* = P + \tilde{\Phi}P + P\tilde{\Phi}^* + \Phi KDK^* \Phi^*$$

Hence, $$\mathcal{M} = \mathcal{H}_\Phi M_m \Phi^* \mathcal{H}_* = \mathcal{H}_{[P+\tilde{\Phi}P+P\tilde{\Phi}^*+\Phi KDK^*\Phi^*]}\mathcal{H}_*$$
$$= D + \mathcal{H}_\Phi KD + DK^*\Phi^* \mathcal{H}_* + \mathcal{H}_\Phi KDK^*\Phi^* \mathcal{H}_* =$$
$$[I + \mathcal{H}_\Phi K]D[I + \mathcal{H}_\Phi K]^* \blacksquare$$

Proof of Lemma 6.2: Using a standard matrix identify we have that $$[I+ \mathcal{H}\Phi K]^{-1}=I- \mathcal{H}\Phi[I+K \mathcal{H}\Phi]^{-1} K \qquad (67)$$

Note that $$\psi^{-1}=I-\mathcal{E}_\psi=(I-\mathcal{E}_\Phi)+\mathcal{E}_\Phi G \quad \mathcal{H}=\Phi^{-1}+K\mathcal{H} \qquad (68)$$

from which it follows that $$\psi^{-1}\Phi=I+K\mathcal{H}\Phi$$

Using this with Eq. (67) it follows that $$[I+ \mathcal{H}\Phi K]^{-1}=I- \mathcal{H}\Phi[\psi^{-1}\Phi]^{-1}K=I- \mathcal{H}\psi K$$

Proof of Lemma 7.1: From Eq. (42) and Eq. (43), the expression for the generalized accelerations $\ddot{X}$ is given by $$\ddot{X}=\mathcal{M}^{-1}(T-C)=[I- \mathcal{H}\psi K]^*D^{-1}[I- \mathcal{H}\psi K][T- \mathcal{H}\Phi[M_m\Phi^*a_m+b_m+K_m v]] \qquad (69)$$

From Eq. (68) we have that $$[I- \mathcal{H}\psi K]\mathcal{H}\Phi= \mathcal{H}\psi[\psi^{-1}-K \mathcal{H}]\Phi= \mathcal{H}\psi \qquad (70)$$

Thus, Eq. (69) can be written as $$\ddot{X}=[I- \mathcal{H}\psi K]^*D^{-1}[T- \mathcal{H}\psi[KT+M_m\Phi^*a_m+b_m+K_m v]] \qquad (71)$$

From Eq. (66) it follows that $$M_m=P-\mathcal{E}_\psi P\mathcal{E}^*_\Phi \to \psi M_m\Phi^*=\psi P+P\tilde{\Phi}^* \qquad (72)$$

and so Eq. (71) simplifies to $$\ddot{X}=[I- \mathcal{H}\psi K]^*D^{-1}[T- \mathcal{H}\psi[KT+Pa_m+b_m+K_m v]- \mathcal{H}P\tilde{\Phi}^*a_m] \qquad (73)$$

From Eq. (68) we have that $$[I- \mathcal{H}\psi K]^*D^{-1} \mathcal{H}P\tilde{\Phi}^*=[I- \mathcal{H}\psi K]^*K^*\Phi^*=K^*\psi^*[\psi^{-*}-K \mathcal{H}]^*\Phi^*= K^*\psi^* \qquad (74)$$

Using this in Eq. (73) leads to the result.

Appendix B: Ruthless Linearization of Flexible Body Dynamics

It has been pointed out in recent literature ([17, 16]) that the use of modes for modeling body flexibility leads to "premature linearization" of the dynamics, in the sense that while the dynamics model contains deformation dependent terms, the geometric stiffening terms are missing. These missing geometric stiffening terms are the dominant terms among the first-order (deformation) dependent terms. In general, it is necessary to take additional steps to recover the missing geometric stiffness terms to obtain a "consistently" linearized model with the proper degree of fidelity. However for systems with low spin rate, there is typically little loss is model fidelity when the deformation and deformation rate dependent terms are dropped altogether from the dynamical equations of motion ([16]). Such models have been dubbed the ruthlessly linearized models. These linearized models are considerably less complex, and do not require most of the modal integrals data for each individual flexible body. In this model, the approximations to $M_m(k)$, $a_m(k)$, and $b_m(k)$ are as follows:

$$M_m(k) \approx M_m^0(k),\ a_m(k) \approx \begin{pmatrix} 0 \\ a_{mR}^0(k) \end{pmatrix},\ \text{and}\ b_m(k) \approx b_m^0(k) \qquad (75)$$

With this approximation, $M_m(k)$ is constant in the body frame, while $a_m(k)$ and $b_m(k)$ are independent of $\eta(k)$ and $\dot{\eta}(k)$. With this being the case, the formation of $D^{-1}$ in Eq. (51) can be simplified. Using the matrix identity.

$$[A+BCB^*]^{-1}=A^{-1}-A^{-1}B[C^{-1}+B^*A^{-1}B]^{-1}B^*A^{-1} \qquad (76)$$

which holds for general matrices, A, B and C, it is easy to verify that $$D_f^{-1}(k)=\Lambda(k)-Y(k)[\Gamma^{-1}(k)+\Omega(k)]^{-1}(k)Y^*(k) \qquad (77)$$

where the matrices $\Lambda(k)$, $\Omega(k)$, and $Y(k)$ are precomputed just once prior to the dynamical simulation as follows:

$$\begin{cases} \text{for } k & = 1\ldots N \\ \Lambda(k) & = [\mathcal{H}_f(k)M_m(k)\mathcal{H}_f^*(k)]^{-1} \in \mathfrak{R}^{\mathcal{N} \times \mathcal{N}} \\ \zeta(k) & = \mathcal{H}_f(k)\mathcal{A}_{(k)} \in \mathfrak{R}^{\mathcal{N} \times 6} \\ Y(k) & = \Lambda(k)\zeta(k) \in \mathfrak{R}^{\mathcal{N} \times 6} \\ \Omega(k) & = \zeta^*(k)Y(k) \in \mathfrak{R}^{6 \times 6} \\ \text{end loop} \end{cases} \qquad (78)$$

Using Eq. (77) reduces the computational cost for computing the articulated body inertias to a quadratic rather than a cubic function of the number of modes.

Appendix C: Expressions for $M_m(k)$, $a_m(k)$ and $b_m(k)$

The modal spatial displacement influence vector $\Pi^j(k)$ for node $j_k$ has the structure:

$$\Pi^j(k) = \begin{pmatrix} \lambda^j(k) \\ \gamma^j(k) \end{pmatrix} \in \mathfrak{R}^{6 \times n_m(k)} \qquad (79)$$

The components of the vectors $\lambda^j(k) \in \mathfrak{R}^{3 \times n_m(k)}$ and $\gamma^j(k) \in \mathfrak{R}^{3 \times n_m(k)}$ are the modal slope displacement influence vector and the modal translational displacement influence vector respectively for node $j_k$. They define the contribution of the various modes to the slope (or differential change in orientation) and translational deformation for the $j_k^{th}$ node on the $k^{th}$ body. Define $$\delta_\omega(j_k) \triangleq \lambda^j(k)\eta(k) \in \mathfrak{R}^3,\ \delta_v(j_k) \triangleq \gamma^j(k)\dot{\eta}(k) \in \mathfrak{R}^3,\ \text{and}$$
$$\delta_l(j_k) \triangleq \gamma^j(k)\eta(k) \in \mathfrak{R}^3 \qquad (80)$$

Note that $$l(k,j_k)=l_0(j_k)+\delta_l(j_k)$$

where $l_0(j_k)$ denotes the undeformed vector from frame $\mathcal{F}_k$ to node $j_k$. Note that $M_s(j_k)$ denotes the spatial inertia of the $j^{th}$ node on the $k^{th}$ body and is given by $$M_s(j_k) = \begin{pmatrix} \mathcal{I}(j_k) & m(j_k)\tilde{p}(j_k) \\ -m(j_k)\tilde{p}(j_k) & m(j_k)I \end{pmatrix} \in \mathfrak{R}^{6 \times 6} \qquad (81)$$

C.1 Modal Integrals for the Individual Bodies

Defined below are a set of modal integrals for the $k^{th}$ body which simplify the computation of the modal mass matrix $M_m(k)$ and the bias vector $b_m(k)$. These modal integrals can be computed as a part of the finite-element structural analysis of the individual bodies.

$$m(k) \triangleq \sum_{j=1_k}^{n_s(k)} m(j_k)$$

$$p_0^k \triangleq [1/m(k)] \sum_{j=1_k}^{n_s(k)} m(j_k)[p(j_k) + l_0(k, j_k)] \in \Re^3$$

$$p_1^k(r) \triangleq [1/m(k)] \sum_{j=1_k}^{n_s(k)} m(j_k)\gamma_r^j(k) \in \Re^3$$

$$E^k(r) \triangleq \sum_{j=1_k}^{n_s(k)} m(j_k)[\gamma_r^j(k) - \bar{p}(j_k)\lambda_r^j(k)] \in \Re^3$$

$$F_0^k(r) \triangleq \sum_{j=1_k}^{n_s(k)} \mathsf{T}(j_k)\lambda_r^j(k) + m(j_k)[\tilde{l}_0(k, j_k) + \tilde{p}(j_k)]\gamma_r^j(k) - m(j_k)\tilde{l}_0(k, j_k)\bar{p}(j_k)\lambda_r^j(k) \in$$

$$F_1^k(r, s) \triangleq \sum_{j=1_k}^{n_s(k)} m(j_k)\tilde{\gamma}_s^j(k)[\gamma_r^j(k) - \bar{p}(j_k)\lambda_r^j(k)] \in \Re^3$$

$$G^k(r, s) \triangleq \sum_{j=1_k}^{n_s(k)} [\lambda_r^j(k)]^* \mathsf{T}(j_k)\lambda_s^j(k) + m(j_k)[\lambda_r^j(k)]^*\bar{p}(j_k)\gamma_s^j(k) + m(j_k)[\lambda_s^j(k)]^*\bar{p}(j_k)\gamma_r^j(k) \, m(j_k)[\gamma_r^j(k)]^*\gamma_s^j(k) \in \Re^1$$

$$\mathsf{T}_0^k \triangleq -\sum_{j=1_k}^{n_s(k)} \mathsf{T}(j_k) - m(j_k)[\tilde{l}_0(k, j_k)\tilde{l}_0(k, j_k) + \tilde{p}(j_k)\tilde{l}_0(k, j_k) + \tilde{l}_0(k, j_k)\tilde{p}(j_k)] \in \Re^{3\times}$$

$$\mathsf{T}_1^k(r) \triangleq \sum_{j=1_k}^{n_s(k)} m(j_k)\tilde{\gamma}_r^j(k)[\tilde{l}_0(k, j_k) + \tilde{p}(j_k)] \in \Re^{3\times 3}$$

$$\mathsf{T}_2^k(r, s) \triangleq -\sum_{j=1_k}^{n_s(k)} m(j_k)\tilde{\gamma}_r^j(k)\tilde{\gamma}_s^j(k) \in \Re^{3\times 3}$$

$$S_1^k(r) \triangleq \sum_{j=1_k}^{n_s(k)} [m(j_k)\bar{p}(j_k)\lambda_r^j(k)]^x \tilde{l}_0(k, j_k) - \mathsf{T}(j_k)\tilde{\lambda}_r^j(k) \in \Re^{3\times 3}$$

$$S_2^k(r, s) \triangleq \sum_{j=1_k}^{n_s(k)} [m(j_k)\bar{p}(j_k)\lambda_r^j(k)]^x \tilde{\gamma}_s^j(k) \in \Re^{3\times 3}$$

$$K_1^j(r) \triangleq \sum_{j=1_k}^{n_s(k)} 2\tilde{l}_0(k, j_k)[m(j_k)\bar{p}(j_k)\lambda_r^j(k)]^x - \mathsf{T}(j_k)\tilde{\lambda}_r^j(k) + \tilde{\lambda}_r^j(k)\mathsf{T}(j_k) \in \Re^{3\times 3}$$

$$= 2[S_1^k(r)]^* - \sum_{j=1_k}^{n_s(k)} [\tilde{\lambda}_r^j(k)\mathsf{T}(j_k) + \mathsf{T}(j_k)\tilde{\lambda}_r^j(k)]$$

$$K_2^j(r, s) \triangleq \sum_{j=1_k}^{n_s(k)} 2\tilde{\gamma}_s^j(k)[m(j_k)\bar{p}(j_k)\lambda_r^j(k)]^x = 2[S_s^k(r, s)]^* \in \Re^{3\times 3}$$

$$R_1^k(r) \triangleq \sum_{j=1_k}^{n_s(k)} \mathsf{T}(j_k)\lambda_r^j(k) \in \Re^3$$

$$R_2^k(r, s) \triangleq \sum_{j=1_k}^{n_s(k)} [\tilde{\lambda}_r^j(k)\mathsf{T}(j_k) - m(j_k)\tilde{l}_0(k, j_k)\tilde{\lambda}_r^j(k)\bar{p}(j_k)]\tilde{\lambda}_s^j(k) \in \Re^3$$

$$R_3^k(q, r, s) \triangleq \sum_{j=1_k}^{n_s(k)} -m(j_k)\tilde{\gamma}_q^j(k)\tilde{\lambda}_r^j(k)\bar{p}(j_k)\lambda_s^j(k) \in \Re^3$$

$$W_1^k(r, s) \triangleq \sum_{j=1_k}^{n_s(k)} \tilde{\lambda}_r^j(k)m(j_k)\bar{p}(j_k)\gamma_s^j(k) \in \Re^3$$

$$W_2^k(r, s) \triangleq \sum_{j=1_k}^{n_s(k)} \tilde{\lambda}_r^j(k)\mathsf{T}(j_k)\lambda_s^j(k) \in \Re^3$$

$$L^k(r, s) \triangleq -[1/m(k)] \sum_{j=1_k}^{n_s(k)} m(j_k)\tilde{\lambda}_r^j(k)\bar{p}(j_k)\lambda_s^j(k) \in \Re^3$$

$$T_1^k(r, s) \triangleq \sum_{j=1_k}^{n_s(k)} [m(j_k)\tilde{\gamma}_r^j(k)\bar{p}(j_k) + \mathsf{T}(j_k)\tilde{\lambda}_r^j(k)]\lambda_s^j(k) \in \Re^3$$

$$T_2^k(r, s) \triangleq \sum_{j=1_k}^{n_s(k)} [m(j_k)\bar{p}(j_k)\tilde{\gamma}^j(k) - \tilde{\lambda}_r^j(k)^\mathsf{T}(j_k)]\lambda_s^j(k) \in \Re^3$$

$$T_3^k(q, r, s) \triangleq \sum_{j=1_k}^{n_s(k)} [\lambda_q^j(k)]^*[m(j_k)\tilde{\gamma}^j(k)\bar{p}(j_k) + {}^\mathsf{T}(j_k)\tilde{\lambda}_r^j(k)]\lambda_s^j(k) \in \Re^1$$

Note that
$$G^k(r,s)=G^k(s,r) \text{ and } \mathcal{J}_2^k(r,s)=\mathcal{J}_2^k(s,r)$$

Also define, $$p(k) \triangleq p_0^k + \sum_{s=1}^{n_m(k)} p_1(s)\eta(s) \in \Re^3 \quad (83)$$

$$F^k(r) \triangleq F_0^k(r) + \sum_{s=1}^{n_m(k)} F_1^k(r,s)\eta(s) \in \Re^3$$

$$N^k(r) \triangleq \left[ \mathsf{T}_1^k(r) + \sum_{s=1}^{n_m(k)} \mathsf{T}_2^k(r,s)\eta(s) \right]^* \in \Re^{3\times 3}$$

$$\mathsf{T}(k) \triangleq \mathsf{T}_0^k + \sum_{r=1}^{n_m(k)} [\mathsf{T}_1^k(r) + \{\mathsf{T}_1^k(r)\}^*]\eta(r) +$$
$$\sum_{r=1}^{n_m(k)}\sum_{s=1}^{n_m(k)} \mathsf{T}_2^k(r,s)\eta(r)\eta(s) \in \Re^{3\times 3}$$

$$S^k(r) \triangleq S_1^k(r) + \sum_{s=1}^{n_m(k)} S_2^k(r,s)\eta(s) \in \Re^{3\times 3}$$

$$K^k(r) \triangleq K_1^k(r) + \sum_{s=1}^{n_m(k)} K_2^k(r,s)\eta(s) \in \Re^{3\times 3}$$

$$R^k(r,s) \triangleq R_2^k(r,s) + \sum_{s=1}^{n_m(k)} R_3^k(q,r,s)\eta(q) \in \Re^3$$

C.2 Modal Mass Matrix

We have from Eq. (23) that the modal mass matrix of the $k^{th}$ body is given by $$M_m(k) = \begin{pmatrix} \Pi^*(k) \\ B(k) \end{pmatrix} M_s(k)[\Pi(k), B^*(k)] = \begin{pmatrix} \Pi^*(k)M_s(k)\Pi(k) & \Pi^*(k)M_s(k)B^*(k) \\ B(k)M_s(k)\Pi(k) & B(k)M_s(k)B^*(k) \end{pmatrix} \quad (84)$$

$$= \begin{pmatrix} M_m^{ff}(k) & M_m^{fr}(k) \\ M_m^{rf}(k) & M_m^{rr}(k) \end{pmatrix} \in \Re^{\mathcal{N}(k)\times\mathcal{N}(k)}$$

Define the matrices:

$$\begin{aligned} p_I^k &\triangleq [p_I^k(1), \ldots p_I^k(n_m(k))] \in \Re^{3\times n_m(k)} \\ F_0^k &\triangleq [F_0^k(1), \ldots F_0^k(n_m(k))] \in \Re^{3\times n_m(k)} \\ F^k &\triangleq [F^k(1), \ldots F^k(n_m(k))] \in \Re^{3\times n_m(k)} \\ E^k &\triangleq [E^k(1), \ldots E^k(n_m(k))] \in \Re^{3\times n_m(k)} \end{aligned} \quad (85)$$

Also define the matrix $G^k \in \Re^{n_m(k)\times n_m(k)}$ so that its $(r,s)^{th}$ element is given by the modal integral $G^k(r,s)$.

Using these matrices, and Eq. (84), it is easy to establish that $$M_m^{ff}(k) = G^k, M_m^{rf}(k) = \begin{pmatrix} F^k \\ E^k \end{pmatrix}, \text{ and}$$

$$M_m^{rr}(k) = \begin{pmatrix} \mathsf{T}(k) & m(k)\tilde{p}(k) \\ -m(k)\tilde{p}(k) & m(k)I \end{pmatrix}$$

Hence, in block partitioned form $$M_m(k) = \begin{pmatrix} G_k & [F^k]^* & [E^k]^* \\ F^k & \mathsf{T}(k) & m(k)\bar{p}(k) \\ E^k & -m(k)\tilde{p}(k) & m(k)I \end{pmatrix} \quad (86)$$

$$= \underbrace{\begin{pmatrix} G_k & [F_0^k]^* & [E^k]^* \\ F_0^k & \mathsf{T}_0^k & m(k)p_0^k \\ E^k & -m(k)\bar{p}_0^k & m(k)I \end{pmatrix}}_{M_m^0(k)} +$$

$$\underbrace{\begin{pmatrix} 0 & [F_1^k\eta]^* & 0 \\ F_1^k\eta & \sum_{r=1}^{n_m(k)}[\mathsf{T}_1^k(r)+[\mathsf{T}_1^k(r)]^*]\eta(r) & m(k)[p_1^k\eta(k)]^x \\ 0 & 0 & 0 \end{pmatrix}}_{M_m^1(k)} +$$

-continued- $$\underbrace{\begin{pmatrix} 0 & 0 & 0 \\ 0 & \sum_{r=1}^{n_m(k)}\sum_{s=1}^{n_m(k)} \mathsf{T}_2^k(r,s)\eta(r)\eta(s) & 0 \\ 0 & 0 & 0 \end{pmatrix}}_{M_m^2(k)}$$

The superscript $i=0,1,2$ in $M_m^i(k)$ denotes the order of dependency of the terms on the deformation variables.

C.3 Expression for $a_m(k)$

In this section we derive explicit expressions for the Coriolis and centrifugal acceleration term $a_m(k)$. Since $$\dot{\phi}(x,y) = \begin{pmatrix} 0 & \bar{l}(x,y) \\ 0 & 0 \end{pmatrix}$$

it follows from Eq. (12) and Eq. (79) that $$\dot{\Phi}(k+1,k) = \begin{pmatrix} 0 & [\Pi^i(k+1)]^* \dot{\phi}(t_{k+1},k) + [\dot{\Pi}^i(k+1)]^* \phi(t_{k+1},k) \\ 0 & \dot{\phi}(k+1,k) \end{pmatrix}$$

$$= \begin{pmatrix} 0 & [\dot{\lambda}^i(k+1)]^* & [\dot{\lambda}^i(k+1)]^* \tilde{l}(t_{k+1},k) + [\dot{\gamma}(k+1)]^* + [\lambda^i(k+1)]^* \dot{\bar{l}}(t_{k+1},k) \\ 0 & 0 & \dot{l}(k+1,k) \\ 0 & 0 & 0 \end{pmatrix}$$

Recalling that the spatial velocity of frame $\mathcal{F}_k$ is $$V(k) = \begin{pmatrix} \omega(k) \\ v(k) \end{pmatrix}$$

where $\omega(k)$ and $v(k)$ denote the angular and linear velocity respectively of $\mathcal{F}_k$ we have that $$\dot{\Pi}^i(k) = \begin{pmatrix} \dot{\lambda}^i(k) \\ \dot{\gamma}(k) \end{pmatrix} = \begin{pmatrix} \tilde{\omega}(k) \lambda^i(k) \\ \tilde{\omega}(k) \gamma(k) \end{pmatrix}$$

And thus $$\dot{\Phi}^*(k+1,k) V_m(k+1) = \begin{pmatrix} 0 \\ \tilde{\omega}(k+1) \delta_\omega(t_{k+1}) \\ -\tilde{l}(t_{k+1},k) \tilde{\omega}(k+1) \delta_\omega(t_{k+1}) + \tilde{\omega}(k+1) \delta_v(t_{k+1}) \\ + \tilde{\delta}_\omega(t_{k+1}) l(t_{k+1},k) + \tilde{\omega}(k+1) \dot{l}(k+1,k) \end{pmatrix}$$

The vector above has bee partitioned so that the term on the top corresponds to modal accelerations, the term in middle to the angular accelerations and the term at the bottom to the linear acceleration of the body. Also $$\dot{l}(k+1, j_{k+1}) = \tilde{\omega}(k+1) l(k+1, j_{k+1}) + \delta_v(j_{k+1})$$

and $$\dot{l}(t_{(k+1)},k) = \tilde{\omega}(t_{k+1}) l(t_{k+1},k) + \Delta_v(k) - \delta_v(d_k) + \tilde{\Delta}_\omega(k) l(\mathcal{O}_k,k)$$
$$= [\tilde{\omega}(k+1) + \tilde{\delta}_\omega(t_{k+1})] l(t_{k+1},k) + \Delta_v(k) - \delta_v(d_k) + \tilde{\Delta}_\omega(k) l(\mathcal{O}_k,k)$$

where $$\Delta_v(k) = \begin{pmatrix} \Delta_\omega(k) \\ \Delta_v(k) \end{pmatrix} = H^*(k) \beta(k) \quad (87)$$

Thus $$\dot{l}(k+1,k) = \dot{l}(k+1,t_{k+1}) + \dot{l}(t_{k+1},k)$$
$$= \tilde{\omega}(k+1) l(k+1,k) + \delta_v(t_{k+1}) + \tilde{\delta}_\omega(t_{k+1}) l(t_{k+1},k) + \Delta_v(k) - \delta_v(d_k) + \tilde{\Delta}_\omega(k) l(\mathcal{O}_k,k)$$

Also $$\dot{\mathcal{H}}_*(k) \triangleq \begin{pmatrix} 0 & 0 \\ -\dot{\Pi}^d(k) & \dot{H}\bar{t}^*(k) \end{pmatrix}$$

and $$\dot{H}^*(k) = \begin{pmatrix} \tilde{\omega}(\mathcal{O}_k) & 0 \\ 0 & \tilde{\omega}(\mathcal{O}_k) \end{pmatrix} H^*(k)$$

$$\dot{l}(\mathcal{O}_k,k) = \omega(\mathcal{O}_k)l(\mathcal{O}_k,k) - \delta_v(d_k)$$

Thus we have that $$\mathcal{H}_*(k)\chi(k) = \begin{pmatrix} 0 \\ \tilde{\omega}(\mathcal{O}_k)\Delta_{\tilde{\omega}}(k) - \omega(k)\delta_\omega(d_k) \\ \tilde{\omega}(\mathcal{O}_k)\Delta_v(k) - \tilde{\omega}(k)\delta_v(d_k) + \tilde{\Delta}_\omega(k)l(\mathcal{O}_k,k) - \tilde{l}(\mathcal{O}_k,k)\tilde{\omega}(\mathcal{O}_k)\Delta_{\tilde{\omega}}(k) \end{pmatrix}$$

From Eq. (25) and the above expressions it follows that $$a_m(k) = \frac{d\Phi^*(k+1,k)}{dt} V_m(k+1) + \frac{d\mathcal{H}_*(k)}{dt} \chi(k) = \begin{pmatrix} 0 \\ \alpha_{mR}(k) \end{pmatrix} \quad (88)$$

where $$a_{mR}(k) \triangleq \begin{pmatrix} \tilde{\omega}(k+1)\delta_\omega(t_{k+1}) + \tilde{\omega}(k)\Delta_{\tilde{\omega}}(k) - \omega(\mathcal{O}_k)\delta_\omega(d_k) \\ \tilde{\omega}(k+1)[\tilde{\omega}(k+1)l(k+1,k) + 2\delta_v(t_{k+1})] + [\tilde{\omega}(t_{k+1}) + \tilde{\omega}(\mathcal{O}_k)][v(k) - v(\mathcal{O}_k^+) + \\ [\tilde{\omega}(k+1) + \tilde{\delta}_\omega(t_{k+1})]\tilde{\delta}_\omega(t_{k+1})l(t_{k+1},k) - [2\tilde{\Delta}_\omega(k) - \delta_\omega(d_k)]\delta_v(d_k) \end{pmatrix}$$

$$= \begin{pmatrix} \tilde{\omega}(k)\Delta_\omega(k) \\ \tilde{\omega}(k+1)\tilde{\omega}(k+1)l_0(k+1,k) + [\tilde{\omega}(k+1) + \tilde{\omega}(k)][v(k) - v(\mathcal{O}_k^+)] \end{pmatrix}$$

$$\alpha^0_{mR}(k)$$

$$+ \tilde{\omega}(k+1)[\tilde{\omega}(k+1)[\delta_1(t_{k+1}) - \delta_1(d_k)] + 2\delta_v(t_{k+1})] \quad (89)$$

$$+[\tilde{\delta}_\omega(t_{k+1}) - \tilde{\delta}_\omega(d_k)][v(k) - v(\mathcal{O}_k^+)] \quad (90)$$

$$+ \tilde{\omega}(k+1)\tilde{\delta}_\omega(t_{k+1})l_0(t_{k+1},k) - 2\tilde{\Delta}_\omega(k)\delta_v(d_k) \; \alpha^1_{mR}(k)$$

$$+ \begin{pmatrix} 0 \\ \tilde{\omega}(k+1)\tilde{\delta}_\omega(t_{k+1})\delta_l(t_{k+1} + \tilde{\delta}_\omega(t_{k+1})\tilde{\delta}_\omega(t_{k+1})l_0(t_k,k-1) + \delta_\omega(d_k)\delta_\omega(d_k)\delta_v(d_k) \end{pmatrix}$$

$$\alpha^2_{mR}(k)$$

$$+ \begin{pmatrix} 0 \\ \tilde{\delta}_\omega(t_{k+1})\tilde{\delta}_\omega(t_{k+1})\delta_l(t_{k+1},k) \end{pmatrix} \quad (91)$$

$$\alpha^3_{mR}(k)$$

In the above $a_{mR}^0(k)$ denotes the deformation independent part of the Coriolis acceleration, while $a_{mR}^1(k)$, $a_{mR}^2(k)$ and $a_{mR}^3(k)$ denote the parts whose dependency on the deformation is up to first, second and third order respectively.

C.4 Expression for $b_m(k)$

We have found Eq. (28) that $$\alpha(j_k) = \frac{d[\Pi^j(k),\phi^*(k,j_k)]}{dt} V_m(k) = \Pi^j(k)\dot{\eta}(k) + \dot{\phi}^*(k,j_k)V(k)$$

Since, $$\dot{l}(k,j_k) = \omega(k)l(k,j_k) + \delta_v(j_k)$$

it follows that $$\alpha(j_k) = \begin{pmatrix} \tilde{\omega}(k)\delta_\omega(j_k) \\ \tilde{\omega}(k)[\tilde{\omega}(k)l(k,j_k) + 2\delta_v(j_k)] \end{pmatrix}$$

Also from Eq. (31) we have that $$b(j_k) = \begin{pmatrix} \tilde{\omega}(j_k)^T(j_k)\omega(j_k) \\ m(j_k)\tilde{\omega}(j_k)\tilde{\omega}(j_k)p(j_k) \end{pmatrix}$$

Thus, $$b(j_k) + M_s(j_k)\alpha(j_k) = \begin{pmatrix} \tilde{\omega}(j_k)^T(j_k)\omega(j_k) + {}^T(j_k)\tilde{\omega}(k)\delta_\omega(j_k) + m(j_k)\tilde{p}(j_k)\tilde{\omega}(k)[\tilde{\omega}(k)l(k,j_k) + 2\delta_v(j_k)] \\ m(j_k)\{-\tilde{p}(j_k)\tilde{\omega}(k)\delta_\omega(j_k) + \tilde{\delta}_\omega(j_k)\tilde{\delta}_\omega(j_k)p(j_k) + \tilde{\delta}_\omega(j_k)\tilde{\omega}(k)p(j_k) + \\ \tilde{\omega}(k)[\tilde{\omega}(k)\{l(k,j_k) + p(j_k)\} + \tilde{\delta}_\omega(j_k)p(j_k) + 2\delta_v(j_k)]\} \end{pmatrix} \quad (92)$$

From Eq. (37) we write $$b_m(k) = \begin{pmatrix} \Pi^*(k) \\ B(k) \end{pmatrix}[b(k) + M_s(k)\alpha(k)] \triangleq \begin{pmatrix} b_\eta^k(1) \\ \vdots \\ b_\eta^k(n_m(k)) \\ b_\omega^k \\ b_v^k \end{pmatrix} \quad (93)$$

We develop expressions for $b_\eta^k(r)$, $b_\omega^k$ and $b_v^k$ in Eq. (93) below. From Eq. (92) and Eq. (93) we have that $$b_\eta^k(r) = \sum_{j=1_k}^{n_s(k)} -\omega^*(k)\tilde{\lambda}_r^j(k)^T(j_k)\omega(k) - \quad (94)$$

$$\omega^*(k)\tilde{\lambda}_r^j(k)\mathcal{J}(j_k)\delta_\omega(j_k) - \delta_\omega(j_k)^*\tilde{\lambda}_r^j(k)\mathcal{J}(j_k)\omega(k) -$$

$$\delta_\omega(j_k)^*\tilde{\lambda}_r^j(k)\mathcal{J}(j_k)\delta_\omega(j_k) - [\lambda_r^j(k)]^*\mathcal{J}(j_k)\tilde{\delta}_\omega(j_k)\omega(k) +$$

$$\omega^*(k)[m(j_k)\tilde{p}(j_k)\lambda_r^j(k)]^* [-\tilde{l}(k,j_k)\omega(k) + 2\delta_v(j_k)] +$$

$$m(j_k)[\gamma_r^j(k)]^*\tilde{p}(j_k)\tilde{\delta}_\omega(j_k)\omega(k) -$$

$$m(j_k)\omega(k)^*\tilde{\gamma}_r^j(k)[-\{\tilde{l}(k,j_k) + \tilde{p}(j_k)\}\omega(k) + 2\delta_v(j_k)] +$$

$$m(j_k)[\gamma_r^j(k)]^* \{\tilde{\delta}_\omega(j_k)\tilde{\delta}_\omega(j_k)p(j_k) +$$

$$\tilde{\delta}_\omega(j_k)\omega(k)p(j_k) + \tilde{\omega}(k)\tilde{\delta}_\omega(j_k)p(j_k)\} =$$

$$\sum_{j=1_k}^{n_s(k)} -\omega^*(k)\tilde{\lambda}_r^j(k)^T(j_k)\omega(k)$$

-continued $$-\omega^*(k)[m(j_k)\tilde{p}(j_k)\lambda_r^j(k)]^*\tilde{l}(k,j_k)\omega(k) \quad (95)$$

$$+\omega^*(k)m(j_k)\tilde{\gamma}_r^j(k)\{\tilde{l}(k,j_k) + \tilde{p}(j_k)\}\omega(k) \quad (96)$$

$$+2\omega^*(k)[m(j_k)\tilde{p}(j_k)\lambda_r^j(k)]^*\delta_v(j_k) \quad (97)$$

$$-2\omega^*(k)m(j_k)\tilde{\gamma}_r^j(k)\delta_v(j_k) \quad (98)$$

$$-[\lambda_r^j(k)]^*\mathcal{J}(j_k)\tilde{\delta}_\omega(j_k)\omega(k) \quad (99)$$

$$+m(j_k)[\gamma_r^j(k)]^*\tilde{p}(j_k)\tilde{\delta}_\omega(j_k)\omega(k) \quad (100)$$

$$+\delta_\omega(j_k)^*\mathcal{J}(j_k)\tilde{\lambda}_r^j(k)\omega(k) \quad (101)$$

$$-\delta_\omega(j_k)^*\tilde{\lambda}_r^j(k)\mathcal{J}(j_k)\omega(k) \quad (102)$$

$$+m(j_k)\delta_\omega(j_k)^*\tilde{\gamma}_r^j(k)\tilde{p}(j_k)\delta_\omega(j_k) \quad (103)$$

$$+\delta_\omega(j_k)^*\mathcal{J}(j_k)\tilde{\lambda}_r^j(k)\delta_\omega(j_k) \quad (104)$$

$$+m(j_k)[\gamma_r^j(k)]^*\tilde{\delta}_\omega(j_k)\tilde{\omega}(k)p(j_k) \quad (105)$$

$$+m(j_k)[\gamma_r^j(k)]^*\tilde{\omega}(k)\tilde{\delta}_\omega(j_k)p(j_k) \quad (106)$$

Using the modal integrals defined in Section C.1, the above terms can be expressed in the following manner:

$$\frac{1}{2}[97] + 102 = -\omega^*(k) \sum_{s=1}^{n_m(k)} T_1^k(s,r)\tilde{\eta}(s)$$

$$\frac{1}{2}[97] + 99 + 101 = -\omega^*(k) \sum_{s=1}^{n_m(k)} [T_2^k(s,r) + W_1^k(r,s) + W_2^k(s,r)]\tilde{\eta}(s)$$

$$94 + 95 = -\omega^*(k)S^k(r)\omega(k)$$
$$96 = -\omega^*(k)N^k(r)\omega(k) \quad (107)$$
$$103 + 104 = \sum_{q=1}^{n_m(k)} \sum_{s=1}^{n_m(k)} T_3^k(q,r,s)\dot{\eta}(q)\dot{\eta}(s)$$

$$100 + 105 = 106$$

$$98 + 100 + 105 + 106 = -2\omega^*(k) \sum_{s=1}^{n_m(k)} F_1^k(s,r)\dot{\eta}(s)$$ Using these, it follows that $$b_\eta^k = -\omega(k)[S^k(r) + N^k(r)]\omega(j_k) + \sum_{q=1}^{n_m(k)} \sum_{s=1}^{n_m(k)} T_3^k(q,r,s)\dot\eta(q)\dot\eta(s) - \quad (108)$$

$$\omega^*(k) \sum_{j=s}^{n_m(k)} [T_1^k(s,r) + T_2^k(s,r) + W_1^k(r,s) + W_2^k(s,r) + 2F_1^k(s,r)]\dot\eta(s)$$

$$= -\omega^*(k)[S^k(r) + N^k(r)]\omega(j_k) - \omega^*(k) \sum_{j=s}^{n_m(k)} Q^k(r,s)\dot\eta(s) + \sum_{q=1}^{n_m(k)} \sum_{s=1}^{n_m(k)} T_3^k(q,r,s)\dot\eta(q)\dot\eta(s)$$

where $$Q^k(r,s) \triangleq T_1^k(s,r) + T_2^k(s,r) + W_1^k(r,s) + W_2^k(s,r) + 2F_1^k(s,r) \quad (109)$$

Once again from Eq. (92) and Eq. (93) we have that $$b_\omega^k = \sum_{j=1_k}^{n_s(k)} \tilde\omega(j_k)^\mathsf{T}(j_k)\omega(j_k) + \mathsf{T}(j_k)\tilde\omega(k)\delta_\omega(j_k) + m(j_k)\tilde{p}(j_k)\tilde\omega(k)[\tilde\omega(k)l(k,j_k) + 2\delta_v(j_k)] + \quad (110)$$

$$m(j_k)\tilde{l}(j_k)\{-\tilde{p}(j_k)\tilde\omega(k)\delta_\omega(j_k) + \tilde\omega(k)[\tilde\omega(k)\{l(k,j_k) + p(j_k)\} + 2\delta_v(j_k)] +$$

$$\tilde\delta_\omega(j_k)\tilde\delta_\omega(j_k)p(j_k) + \tilde\delta_\omega(j_k)\tilde\omega(k)p(j_k) + \tilde\omega(k)\tilde\delta_\omega(j_k)p(j_k)\}$$

$$= \sum_{j=1_k}^{n_s(k)} \tilde\omega(k)[\mathsf{T}(j_k) - m(j_k)(\tilde{p}(j_k)\tilde{l}(k,j_k) + \tilde{l}(j_k)\tilde{p}(k,j_k) + \tilde{l}(j_k)\tilde{l}(k,j_k)]\omega(k))$$

$$- 2m(j_k)[\tilde{l}(j_k) + \tilde{p}(j_k)] \tilde\delta_v(j_k)\omega(k) \quad (111)$$
$$- \mathcal{J}(j_k)\tilde\delta_\omega(j_k)\omega(k) \quad (112)$$
$$+ \tilde\delta_\omega(j_k) \mathcal{J}(k)\omega(k) \quad (113)$$
$$+ \tilde{l}(j_k)m(j_k)\tilde{p}(j_k)\tilde\delta_\omega(j_k)\omega(k) \quad (114)$$
$$+ \tilde\omega(k) \mathcal{J}(j_k)\delta_\omega(j_k) \quad (115)$$
$$+ \tilde\delta_\omega(j_k) \mathcal{J}(j_k)\delta_\omega(j_k) \quad (116)$$
$$+ \tilde{l}(j_k)m(j_k)\tilde\delta_\omega(j_k)\tilde\delta_\omega(j_k)p(j_k) \quad (117)$$
$$+ m(j_k)\tilde{l}(j_k)\tilde\delta_\omega(j_k)\tilde\omega(k)p(j_k) \quad (118)$$
$$+ m(j_k)\tilde{l}(j_k)\tilde\omega(k)\tilde\delta_\omega(j_k)p(j_k) \quad (119)$$

Once again, using modal integrals, the above terms can be reexpressed in the following manner:

$$110 = \omega^*(k) \mathcal{J}(k)\omega(k) \quad (120)$$

$$111 = \left[2 \sum_{r=1}^{n_m(k)} N^k(r)\dot\eta(r)\right] \omega(k)$$

$$112 + 113 + 114 + 118 + 119 = \sum_{r=1}^{n_m(k)} K^k(r)\dot\eta(r)\omega(k)$$

$$115 = \tilde\omega(k) \sum_{r=1}^{n_m(k)} R_1^k(r)\dot\eta(r)$$

$$116 + 117 = \sum_{r=1}^{n_m(k)} \sum_{s=1}^{n_m(k)} R^k(r,s)\dot\eta(r)\dot\eta(s)$$

This results in the following expression $$b_\omega^k = \tilde\omega(k)^\mathsf{T}(k)\omega(k) + \sum_{r=1}^{n_m(k)} [2N^k(r) + K^k(r)]\dot\eta(r)\omega(k) + \quad (121)$$

$$\tilde\omega(k) \sum_{r=1}^{n_m(k)} R_1^k(r)\dot\eta(r) + \sum_{r=1}^{n_m(k)} \sum_{s=1}^{n_m(k)} R^k(r,s)\dot\eta(r)\dot\eta(s)$$

Using Eq. (92) and Eq. (93) it also follows that $$b_v^k = \sum_{j=1_k}^{n_s(k)} -m(j_k)\tilde{p}(j_k)\tilde\omega(k)\delta_\omega(j_k) + m(j_k)\tilde\omega(k)[\tilde\omega(k)\{l(k,j_k) + p(j_k)\} + 2\delta_v(j_k)] + \quad (122)$$

$$m(j_k)\tilde\delta_\omega(j_k)\tilde\delta_\omega(j_k)p(j_k) + m(j_k)\tilde\delta_\omega(j_k)\tilde\omega(k)p(j_k) + m(j_k)\tilde\omega(k)\tilde\delta_\omega(j_k)p(j_k)$$

$$= \sum_{j=1_k}^{n_s(k)} -m(j_k)\tilde{p}(j_k)\tilde\omega(k)\delta_\omega(j_k)$$

$$+ m(j_k)\tilde\omega(k)\tilde\omega(k)\{l(k,j_k) + p(j_k)\} \quad (123)$$
$$+ m(j_k)\tilde\delta_\omega(j_k)\tilde\delta_\omega(j_k)p(j_k) \quad (124)$$
$$+ 2m(j_k)\tilde\omega(k)\delta_v(j_k) \quad (125)$$
$$+ m(j_k)\tilde\delta_\omega(j_k)\tilde\omega(k)p(j_k) \quad (126)$$
$$+ m(j_k)\tilde\omega(k)\tilde\delta_\omega(j_k)p(j_k) \quad (127)$$

Using the model integrals we have that $$123 = m(k)\tilde{\omega}(k)\tilde{\omega}(k)p(k)$$

$$124 = m(k)\sum_{r=1}^{n_m(k)}\sum_{s=1}^{n_m(k)} L(r,s)\dot{\eta}(r)\dot{\eta}(s)$$

$$122 + 125 + 126 + 127 = 2\bar{\omega}(k)\sum_{r=1}^{n_m(k)} E^k(r)\dot{\eta}(r)$$

and thus $$b_V^k = m(k)\tilde{\omega}(k)\tilde{\omega}(k)p(k) + 2\bar{\omega}(k)\sum_{r=1}^{n_m(k)} E^k(r)\dot{\eta}(r) + \quad (129)$$

$$m(k)\sum_{r=1}^{n_m(k)}\sum_{s=1}^{n_m(k)} L(r,s)\dot{\eta}(r)\dot{\eta}(s)$$

Putting together Eq. (108), Eq. (121) and Eq. (129) we have that $$b_m(k) = \underbrace{\begin{pmatrix} -\omega^*(k)[S_1^k(1) + T_1^k(1)]\omega(k) \\ \vdots \\ -\omega^*(k)[S_1^k(n_m(k)) + T_1^k(n_m(k))]\omega(k) \\ \bar{\omega}(k)\,T_0^k\omega(k) \\ m(k)\tilde{\omega}(k)\tilde{\omega}(k)p_0(k) \end{pmatrix}}_{b_m^0(k)} + \underbrace{\begin{pmatrix} -\omega^*(k)\sum_{j=s}^{n_m(k)}[Q^k(1,s)\dot{\eta}(s) + \{S_2^k(1,s) + T_0^k(1,s)\}\eta(s)] \\ \vdots \\ -\omega^*(k)\sum_{j=s}^{n_M(k)}[Q^k(n_m(k),s)\dot{\eta}(s) + \{S_2^k(n_m(k),s) + T_2^k(n_m(k),s)\}\eta(s)] \\ \sum_{r=1}^{n_m(k)}[\tilde{\omega}(k)\{T_1^k(r) + [T_1^k(r)]^*\}\eta(r)\omega(k) + \{2[T_1^k(r)]^* + K^k(r)\}\dot{\eta}(r)\omega(k) + \tilde{\omega}(k)R_1^k(r)\dot{\eta}(r)] \\ \tilde{\omega}(k)[m(k)\tilde{\omega}(k)\,p_1^k\eta + 2E^k\dot{\eta}] \end{pmatrix}}_{b_m^1(k)} + \underbrace{\begin{pmatrix} \sum_{q=1}^{n_m(k)}\sum_{s=1}^{n_m(k)} T_3^k(q,1,s)\dot{\eta}(q)\dot{\eta}(s) \\ \vdots \\ \sum_{q=1}^{n_m(k)}\sum_{s=1}^{n_m(k)} T_3^k(q,n_m(k),s)\dot{\eta}(q)\dot{\eta}(s) \\ \sum_{r=1}^{n_m(k)}\sum_{s=1}^{n_m(k)}[\tilde{\omega}(k)T_2^k(r,s)\omega(k)\eta(r)\eta(s) + T_2^k(r,s)\omega(k)\dot{\eta}(r)\eta(s) + R_2^k(r,s)\dot{\eta}(r)\dot{\eta}(s)] \\ m(k)\sum_{r=1}^{n_m(k)}\sum_{s=1}^{n_m(k)} L(r,s)\dot{\eta}(r)\dot{\eta}(s) \end{pmatrix}}_{b_m^2(k)} + \quad (130)$$

$$\begin{pmatrix} 0 \\ \cdot \\ \cdot \\ \cdot \\ 0 \\ \sum_{q=1}^{n_m(k)} \sum_{r=1}^{n_m(k)} \sum_{s=1}^{n_m(k)} R_3{}^k(q,r,s)\eta(q)\dot\eta(r)\dot\eta(s) \\ 0 \end{pmatrix}$$

$b_m{}^3(k)$

What is claimed is:

1. A method for controlling a manipulator relative to a desired manipulator motion, said manipulator comprising plural bodies including an outermost body, and a relatively stationary innermost body, said plural bodies being sequentially connected together by movable hinges disposed between each plural body so connected and servos controlling said movable hinges in accordance with servo command signals corresponding to specified body forces of respective ones of said plural bodies, at least some of said plural bodies being flexible in plural deformation modes corresponding to respective modal spatial influence vectors relating deformations of plural spaced nodes of respective plural bodies to said plural deformation modes, said method comprising the steps of:

computing articulated body quantities for each of said plural bodies from respective modal spatial influence vectors;

computing modal deformation accelerations of said plural spaced nodes of respective plural bodies and hinge accelerations of said movable hinges from said specified body forces, from said articulated body quantities and from said modal spatial influence vectors;

comprising said modal deformation and hinge accelerations with said desired manipulator motion to determine an error, and correcting said specified body forces so as to reduce said error thereby producing corrected specified body forces;

generating said servo command signals by converting in a processor means said corrected specified body forces to servo commands to correct manipulator motion to said desired manipulator motion, and transmitting said servo command signals to said servos.

2. The method of claim 1 wherein said step of computing articulated body quantities comprises, for each body beginning at said outermost body:

computing a modal mass matrix;

computing an articulated body inertia from the articulated body inertia of a previous body and from said modal mass matrix;

computing an articulated hinge inertia from said articulated body inertia;

computing an articulated body to hinge force operator from said articulated hinge inertia;

computing a null force operator from said articulated body to hinge force operator.

3. The method of claim 2 wherein said step of computing a null force operator is followed by revising said articulated body inertia by transforming said articulated body inertia by said null force operator to produce a revised articulated body inertia.

4. The method of claim 2 wherein said plural bodies and movable hinges are characterized by respective vectors of deformation and hinge configuration variables, and wherein said computing modal deformation accelerations and hinge accelerations comprises:

for each one of said plural bodies beginning with said outermost body:

computing a residual body force from a residual body force of a previous body and from said vector of deformation and hinge configuration variables, computing a resultant hinge force from said specified body force and said residual body force, computing a resultant hinge acceleration from said resultant hinge force transformed by said articulated hinge inertia;

and, for each one of said plural bodies beginning with said innermost body:

computing a current modal body acceleration of a current body from a modal body acceleration of a previous body, computing a modal deformation acceleration and hinge acceleration from said resultant hinge acceleration and from said current modal body acceleration transformed by said articulated body to hinge force operator.

5. The method of claim 4 wherein:

said step of computing a resultant hinge acceleration is followed by the step of revising said residual body force by said resultant hinge force transformed by said body to hinge force operator to produce a revised residual body force for use in said correcting of said specified body forces; and said step of computing a modal deformation acceleration and hinge acceleration is followed by the step of revising said current modal body acceleration based upon said modal deformation and hinge acceleration to produce a revised current modal body acceleration for use in said correcting of said specified body forces.

6. The method of claim 5 wherein all said computing comprises a single cycle corresponding to one of a succession of time steps, all said computing being repeated for subsequent time steps, wherein said vector of deformation and hinge configuration variables are computed from the modal deformations and hinge accelerations of a previous time step and wherein the revised articulated body inertia, revised residual body force and revised current modal body acceleration from the previous time step are used for computing in a current time step.

7. The method of claim 4 wherein said manipulator comprises joint sensors at each of said movable hinges, and wherein a hinge configuration portion of said vector of deformation and hinge configuration variables is derived from reading said joint sensors.

8. The method of claim 4 wherein said articulated body inertia, said articulated hinge inertia, said body to hinge force operator, said null force operator, said specified body force, said residual body force, said resultant hinge acceleration and said resultant hinge force each corresponds to a flexible and a rigid version thereof.

9. The method of claim 8 wherein said step of computing a resultant hinge force comprises computing the flexible version of said resultant hinge force from said specified body force, said flexible version of said residual body force and from rigid version of said residual body force transformed by said modal spatial influence vector.

10. The method of claim 8 wherein said articulated body inertia comprises a rigid-flexible and rigid-rigid coupling components thereof, and wherein said method further comprises the step of revising said rigid version of said residual body force based upon a function of said rigid-rigid and rigid-flexible coupling components of said articulated body inertia and a flexible version of said articulated body inertia to produce a revised rigid version of said residual body force for use in said correcting of said specified body forces.

11. The method of claim 10 wherein said computing said articulated body inertia step comprises decomposing said modal mass matrix into rigid-flexible and rigid-rigid coupling components and computing said rigid-rigid and rigid-flexible coupling components of said articulated body inertia from respective ones of said rigid-rigid and rigid-flexible coupling components of said modal mass matrix.

12. The method of claim 11 wherein said computing said articulated body quantities step is preceded by the step of computing flexible and rigid versions of a deformation and hinge modal joint map matrix for each plural body, and wherein:

the flexible version of said articulated hinge inertia is computed from said articulated body inertia transformed by the flexible version of the corresponding deformation and hinge modal joint map matrix;

the rigid version of said articulated body inertia is computed from a function of said rigid-rigid and rigid-flexible coupling components of said articulated body inertia transformed by said flexible version of said corresponding deformation and hinge modal joint map matrix;

the rigid version of said articulated body inertia is computed from said rigid version of said articulated body inertia;

the rigid version of said body to hinge force operator is computed from said rigid versions of said articulated body inertia and said articulated hinge inertia.

13. The method of claim 12 wherein said computing flexible and rigid versions of a deformation and hinge modal joint map matrix step comprises computing a joint map matrix corresponding to unit vectors of said movable hinges and computing said deformation and hinge modal joint matrix from said joint map matrix and from said modal spatial influence vector.

14. The method of claim 8 wherein the flexible version of said resultant hinge acceleration is computed from the flexible versions of said articulated hinge inertia and resultant hinge force, and the rigid version of said resultant hinge acceleration is computed from the rigid versions of said articulated hinge inertia and resultant hinge force.

15. The method of claim 14 further comprising the step of revising said residual body force by adding to said residual body force a product of the rigid versions of said resultant hinge force and said body to hinge force operator to produce a revised residual body force for use in said correcting of said specified body forces.

16. Apparatus for controlling a manipulator relative to a desired manipulator motion based upon specified body forces, said manipulator comprising plural bodies including an outermost body, and a relatively stationary innermost body, said plural bodies being sequentially connected together by movable hinges disposed between each plural body so connected and servos controlling said movable hinges in accordance with servo command signals corresponding to specified body forces of respective ones of said plural bodies, at least some of said plural bodies being flexible in plural deformation modes corresponding to respective modal spatial influence vectors relating deformations of plural spaced nodes of respective plural bodies to said plural deformation modes, said apparatus comprising:

means for computing articulated body quantities for each of said plural bodies from respective modal spatial influence vectors;

means for computing modal deformation accelerations of said plural spaced nodes of respective plural bodies and hinge accelerations of said movable hinges from said specified body forces, from said articulated body quantities and from said modal spatial influence vectors;

means for comparing said modal deformation and hinge accelerations with said desired manipulator motion so as to determine a motion discrepancy, and correcting said specified body forces so as to reduce said motion discrepancy; and means for generating said servo command signals by converting in a processor means said corrected specified body forces to servo commands to correct manipulator motion to said desired manipulator motion, and transmitting said servo command signals to said servos.

17. The apparatus of claim 16 wherein said means for computing articulated body quantities comprises a means, operative for each plural body, beginning at said outermost body for:

computing a modal mass matrix;

computing an articulated body inertia from the articulated body inertia of a previous body and from said modal mass matrix;

computing an articulated body to hinge force operator from said articulated hinge inertia;

computing a null force operator from said articulated body to hinge force operator.

18. The method of claim 17 further comprising means for revising said articulated body inertia by transforming said articulated body inertia by said null force operator to produce a revised articulated body inertia.

19. The apparatus of claim 17 wherein said plural bodies and movable hinges are characterized by respective vectors of deformation and hinge configuration variables, and wherein said means for computing modal deformation accelerations and hinge accelerations comprise:

means operative for each one of said plural bodies beginning with said outermost body, for:

computing a residual body force from a residual body force of a previous body and from said vector of deformation and hinge configuration variables, computing a resultant hinge force from said specified body force and said residual body force, computing a resultant hinge acceleration from said resultant hinge force transformed by said articulated hinge inertia;

and, means operative for each one of said plural bodies beginning with said innermost body, for:

computing a current modal body acceleration of a current body from a modal body acceleration of a previous body, computing a modal deformation acceleration and hinge acceleration from said resultant hinge acceleration and from said current modal body acceleration transformed by said articulated body to hinge force operator.

20. The apparatus of claim 19 further comprising:

means for revising said residual body force by said resultant hinge force transformed by said body to hinge force operator to produce a revised residual body force for use in said correcting of said specified body forces; and means for revising said current modal body acceleration based upon said modal deformation and hinge acceleration to produce a revised current modal body acceleration for use in said correcting of said specified body forces.

21. The apparatus of claim 20 wherein said means for computing modal deformation accelerations of said plural spaced nodes of respective plural bodies and hinge accelerations of said movable hinges comprises means for computing said modal deformation accelerations and hinge accelerations once for each one of a succession of time steps, and wherein said means for computing modal deformation accelerations of said plural spaced nodes of respective plural bodies and hinge accelerations of said movable hinges further comprises means for computing said vector of deformation and hinge configuration variables from the modal deformations and hinge accelerations of a previous time step and wherein the revised articulated body inertia, revised residual body force and revised current modal body acceleration from the previous time step are used for computing said modal deformation accelerations and hinge accelerations during a current time step.

22. The apparatus of claim 19 further comprising means connected to joint sensors at each of said movable hinges for producing a hinge configuration portion of said vector of deformation and hinge configuration variables.

23. The apparatus of claim 19 wherein said articulated body inertia, said articulated hinge inertia, said body to hinge force operator, said null force operator, said specified body force, said residual body force, said resultant hinge acceleration and said resultant hinge force each comprises at least one of a flexible and rigid version thereof.

24. The apparatus of claim 23 wherein said means for computing a resultant hinge force comprises means for computing the flexible version of said resultant hinge force from said specified body force, said flexible version of said residual body force and from said rigid version of said residual body force transformed by said modal spatial influence vector.

25. The apparatus of claim 23 further comprising means for revising said rigid version of said residual body force based upon a function of rigid-rigid and rigid-flexible coupling components of said articulated body inertia and a flexible version of said articulated body inertia to produce a revised rigid version of said residual body force for use in said correcting of said specified body forces.

26. The apparatus of claim 25 wherein said means for computing said articulated body inertia comprises means for decomposing said modal mass matrix into rigid-flexible and rigid-rigid coupling components and for computing said rigid-rigid and rigid-flexible coupling components of said articulated body inertia from respective ones of said rigid-rigid and rigid-flexible coupling components of said modal mass matrix.

27. The apparatus of claim 26 further comprising means for computing flexible and rigid versions of a deformation and hinge modal joint map matrix for each plural body, and further comprising:

a means for computing the flexible version of said articulated hinge inertia, comprising means for computing the flexible version of said articulated hinge inertia from said articulated body inertia transformed by the flexible version of the corresponding deformation and hinge modal joint map matrix;

a means for computing the rigid version of said articulated body inertia, comprising means for computing the rigid version of said articulated body inertia from a function of said rigid-rigid and rigid-flexible coupling components of said articulated body inertia transformed by said flexible version of said corresponding deformation and hinge modal joint map matrix;

a means for computing the rigid version of said articulated hinge inertia, comprising means for computing the rigid version of said articulated hinge inertia from said rigid version of said articulated body inertia;

a means for computing the rigid version of said body to hinge force operator, comprising means for computing the rigid version of said body to hinge force operator from said rigid versions of said articulated body inertia and said articulated hinge inertia.

28. The apparatus of claim 27 wherein said means for computing flexible and rigid versions of a deformation and hinge modal joint map matrix comprises means for computing a joint map matrix corresponding to unit vectors of said movable hinges and means for computing said deformation and hinge modal joint map matrix from said joint map matrix and from said modal spatial influence vector.

29. The apparatus of claim 23 further comprising a means for computing the flexible version of said resultant hinge acceleration from the flexible versions of said articulated hinge inertia and resultant hinge force, and a means for computing the rigid version of said resultant hinge acceleration from the rigid versions of said articulated hinge inertia and resultant hinge force.

30. The apparatus of claim 29 further comprising means for revising said residual body force by adding to said residual body force a product of the rigid versions of said resultant hinge force and said body to hinge force operator to create a revised residual body force for use in said correcting of said specified body forces.

31. A manipulator controller for a manipulator responsive to specified body forces, said manipulator comprising plural bodies including an outermost body, and an innermost body, said plural bodies being sequentially connected together by movable hinges, disposed between each plural body so connected and servos controlling said movable hinges in accordance with servo command signals corresponding to specified body forces of respective ones of said plural bodies, at least some of said plural bodies being flexible in plural deformation modes corresponding to respective modal spatial influence vectors relating deformations of plural spaced nodes of respective plural bodies to said plural deformation modes, said manipulator controller comprising:

means for computing articulated body quantities for each of said plural bodies from respective modal spatial influence vectors;

means for computing modal deformation accelerations of said plural spaced nodes of respective plural bodies and hinge accelerations of said movable hinges from said specified body forces, from said articulated body quantities and from said modal spatial influence vectors;

means for comparing said modal deformation and hinge accelerations with said desired manipulator motion so as to determine a motion discrepancy, and correcting said specified body forces so as to reduce said motion discrepancy; and means for generating said servo command signals by converting in a processor means said corrected specified body forces to servo commands to correct manipulator motion to a desired manipulator motion, and transmitting said servo command signals to said servos.

32. The apparatus of claim 31 wherein said means for computing articulated body quantities comprises a means, operative for each plural body, beginning at said outermost body for:

computing a modal mass matrix;

computing an articulated body inertia from the articulated body inertia of a previous body and from said modal mass matrix;

computing an articulated hinge inertia from said articulated body inertia;

computing an articulated body to hinge force operator from said articulated hinge inertia;

computing a null force operator from said articulated body to hinge force operator.

33. The method of claim 32 further comprising means for revising said articulated body inertia by transforming said articulated body inertia by said null force operator to produce a revised articulated body inertia.

34. The apparatus of claim 32 wherein said plural bodies and movable hinges are characterized by respective vectors of deformation and hinge configuration variables, and wherein said means for computing modal deformation accelerations and hinge accelerations comprise:

means operative for each one of said plural bodies beginning with said outermost body, for:

computing a residual body force from a residual body force of a previous body and from said vector of deformation and hinge configuration variables, computing a resultant hinge force from said specified body force and said residual body force, computing a resultant hinge acceleration from said resultant hinge force transformed by said articulated hinge inertia;

and, means operative for each one of said plural bodies beginning with said innermost body, for:

computing a current modal body acceleration of a current body from a modal body acceleration of a previous body, computing a modal deformation acceleration and hinge acceleration from said resultant hinge acceleration and from said current modal body acceleration transformed by said articulated body to hinge force operator.

35. The apparatus of claim 34 further comprising:

means for revising said residual body force by said resultant hinge force transformed by said body to hinge force operator to produce a revised residual body force for use in said correcting of said specified body forces; and means for revising said current modal body acceleration based upon said modal deformation and hinge acceleration to produce a revised current modal body acceleration for use in said correcting of said specified body forces.

36. The apparatus of claim 35 wherein said means for computing modal deformation accelerations of said plural spaced nodes of respective plural bodies and hinge accelerations of said movable hinges comprises means for computing said modal deformation accelerations and hinge accelerations once for each one of a succession of time steps, and wherein said means for computing modal deformation accelerations of said plural spaced nodes of respective plural bodies and hinge accelerations of said movable hinges further comprises means for computing said vector of deformation and hinge configuration variables from the modal deformations and hinge accelerations of a previous time step and wherein the revised articulated body inertia, revised residual body force and revised current modal body acceleration from the previous time step are used for computing said modal deformation accelerations and hinge accelerations during a current time step.

37. The apparatus of claim 34 further comprising means connected to joint sensors at each of said movable hinges for producing a hinge configuration portion of said vector of deformation and hinge configuration variables.

38. The apparatus of claim 34 wherein said articulated body inertia, said articulated hinge inertia, said body to hinge force operator, said null force operator, said specified body force, said residual body force, said resultant hinge acceleration and said resultant hinge force each comprises at least one of a flexible and rigid version thereof.

39. The apparatus of claim 38 wherein said means for computing a resultant hinge force comprises means for computing the flexible version of said resultant hinge force from said specified body force, said flexible version of said residual body force and from said rigid version of said residual body force transformed by said modal spatial influence vector.

40. The apparatus of claim 38 further comprising means for revising said rigid version of said residual body force based upon a function of rigid-rigid and rigid-flexible coupling components of said articulated body inertia and a flexible version of said articulated body inertia to produce a revised rigid version of said residual body force for use in said correcting of said specified body forces.

41. The apparatus of claim 40 wherein said means for computing said articulated body inertia comprises means for decomposing said modal mass matrix into rigid-flexible and rigid-rigid coupling components and for computing said rigid-rigid and rigid-flexible coupling components of said articulated body inertia from respective ones of said rigid-rigid and rigid-flexible coupling components of said modal mass matrix.

42. The apparatus of claim 41 further comprising means for computing flexible and rigid versions of a deformation and hinge modal joint map matrix for each plural body, and further comprising:

a means for computing the flexible version of said articulated hinge inertia, comprising means for computing the flexible version of said articulated hinge inertia from said articulated body inertia transformed by the flexible version of the corresponding deformation and hinge modal joint map matrix;

a means for computing the rigid version of said articulated body inertia, comprising means for computing the rigid version of said articulated body inertia from a function of said rigid-rigid and rigid-flexible coupling components of said articulated body inertia transformed by said flexible version of said corresponding deformation and hinge modal joint map matrix;

a means for computing the rigid version of said articulated hinge inertia, comprising means for computing the rigid version of said articulated hinge inertia from said rigid version of said articulated body inertia;

a means for computing the rigid version of said body to hinge force operator, comprising means for computing the rigid version of said body to hinge force operator from said rigid versions of said articulated body inertia and said articulated hinge inertia.

43. The apparatus of claim 42 wherein said means for computing flexible and rigid versions of a deformation and hinge modal joint map matrix comprises means for computing a joint map matrix corresponding to unit vectors of said movable hinges and means for computing said deformation and hinge modal joint map matrix from said joint map matrix and from said modal spatial influence vector.

44. The apparatus of claim 38 further comprising a means for computing the flexible version of said resultant hinge acceleration from the flexible versions of said articulated hinge inertia and resultant hinge force, and a means for computing the rigid version of said resultant hinge acceleration from the rigid versions of said articulated hinge inertia and resultant hinge force.

45. The apparatus of claim 44 further comprising means for revising said residual body force by adding to said residual body force a product of the rigid versions of said resultant hinge force and said body to hinge force operator to create a revised residual body force for use in said correcting of said specified body forces.

* * * * *